(12) United States Patent
Kimura et al.

(10) Patent No.: US 7,978,297 B2
(45) Date of Patent: Jul. 12, 2011

(54) ELECTRO-OPTICAL DEVICE HAVING RESISTOR WITH ADJUSTABLE RESISTANCE VALUE CONNECTED TO IC AND WIRING LINES

(75) Inventors: Fusashi Kimura, Matsumoto (JP); Shinichi Kobayashi, Azumino (JP); Yuki Okuhara, Suwa (JP); Kenichi Tajiri, Shiojiri (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 12/081,604

(22) Filed: Apr. 17, 2008

(65) Prior Publication Data

US 2008/0239207 A1  Oct. 2, 2008

Related U.S. Application Data

(62) Division of application No. 11/437,800, filed on May 22, 2006, now Pat. No. 7,714,411.

(30) Foreign Application Priority Data

May 30, 2005   (JP) ................................. 2005-156677
Sep. 28, 2005  (JP) ................................. 2005-281392

(51) Int. Cl.
*G02F 1/1345* (2006.01)

(52) U.S. Cl. ..................... 349/152; 349/151; 257/536

(58) Field of Classification Search ................. 349/151, 349/152; 257/536
See application file for complete search history.

(56) References Cited

U.S. PATENT DOCUMENTS

| | | | |
|---|---|---|---|
| 4,191,938 A | 3/1980 | Gow, III et al. | |
| 5,530,270 A | 6/1996 | Takahashi et al. | |
| 5,679,493 A | 10/1997 | Kai | |
| 6,265,770 B1 | 7/2001 | Uchiyama | |
| 6,683,669 B1 * | 1/2004 | Fujikawa | 349/149 |
| 6,930,744 B1 * | 8/2005 | Ukita | 349/152 |
| 6,954,249 B2 | 10/2005 | Muramatsu et al. | |
| 7,038,675 B2 | 5/2006 | Kawamura et al. | |
| 2001/0020997 A1 * | 9/2001 | Takeishi et al. | 349/149 |
| 2002/0060767 A1 * | 5/2002 | Muramatsu et al. | 349/139 |

(Continued)

FOREIGN PATENT DOCUMENTS

JP   A-02-056962   2/1990

(Continued)

OTHER PUBLICATIONS

Jun. 11, 2008 Office Action in U.S. Appl. No. 11/437,800.

(Continued)

*Primary Examiner* — Michael H Caley

(74) *Attorney, Agent, or Firm* — K&L Gates LLP

(57) ABSTRACT

An electro-optical device includes: a substrate; a plurality of wiring lines which is formed on the substrate; and an IC which is mounted on the substrate so as to be electrically connected to the plurality of wiring lines. At least a pair of wiring lines among the plurality of wiring lines include a first conductive layer formed on the substrate and a second conductive layer formed on at least the first conductive layer. The first conductive layer and the second conductive layer have different resistance values. The first conductive layer of one of the pair of wiring lines has a plurality of first resistors each extending toward the other wiring line, and the second conductive layer of the other wiring line has a second resistor extending toward the one wiring line. The plurality of first resistors is connected to the second resistor.

12 Claims, 18 Drawing Sheets

U.S. PATENT DOCUMENTS

| | | | |
|---|---|---|---|
| 2004/0104903 A1* | 6/2004 | You | 345/204 |
| 2004/0262035 A1 | 12/2004 | Ko et al. | |
| 2006/0033874 A1 | 2/2006 | Sakama et al. | |
| 2006/0192738 A1 | 8/2006 | Kawamura et al. | |
| 2007/0080905 A1 | 4/2007 | Takahara | |

FOREIGN PATENT DOCUMENTS

| | | |
|---|---|---|
| JP | A-04-186801 | 7/1992 |
| JP | U-6-36037 | 5/1994 |
| JP | A-10-032281 | 3/1998 |
| JP | A-10-303521 | 11/1998 |
| JP | A-2002-008902 | 1/2002 |
| JP | A-2003-107423 | 4/2003 |
| JP | A-2005-018312 | 1/2005 |
| JP | A-2005-101977 | 4/2005 |
| WO | WO98/48321 | 10/1998 |
| WO | WO 2004/100118 A1 | 11/2004 |

OTHER PUBLICATIONS

Dec. 8, 2008 Office Action in U.S. Appl. No. 11/437,800.
May 12, 2009 Office Action in U.S. Appl. No. 11/437,800.
Nov. 3, 2009 Office Action in U.S. Appl. No. 11/437,800.
Jun. 11, 2008 Office Action issued in U.S. Appl. No. 11/437,800.
Dec. 8, 2008 Final Rejeciton issued in U.S. Appl. No. 11/437,800.
May 12, 2009 Office Action issued in U.S. Appl. No. 11/437,800.
Nov. 3, 2009 Final Rejection issued in U.S. Appl. No. 11/437,800.

* cited by examiner

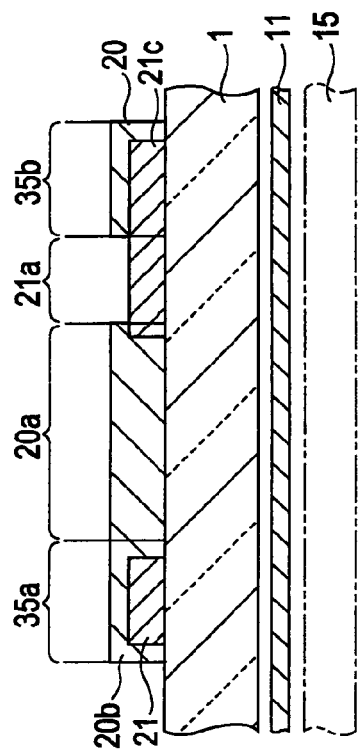
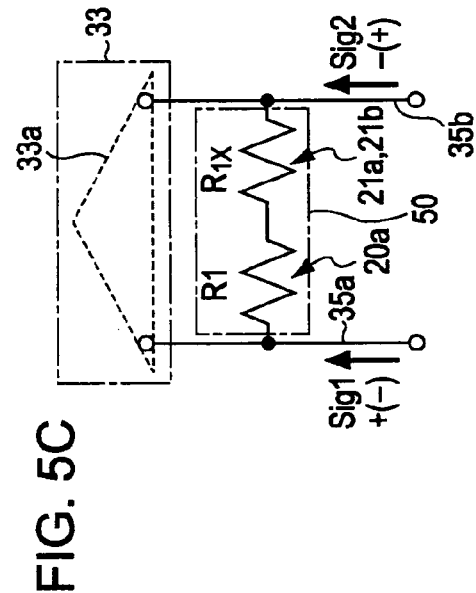
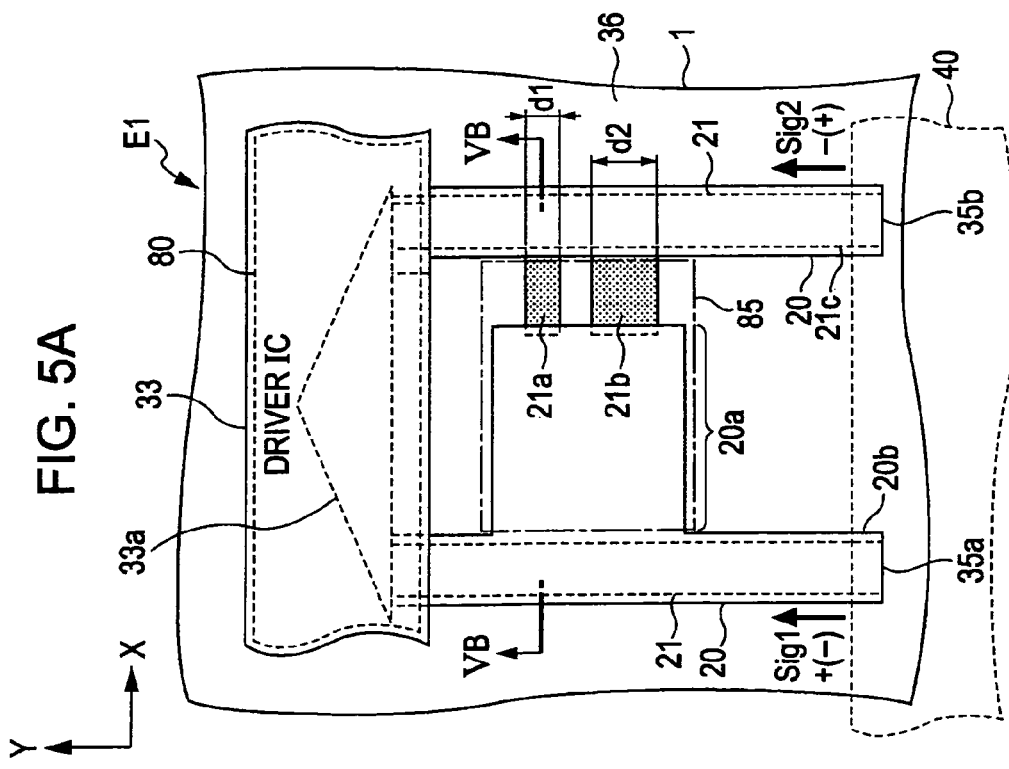

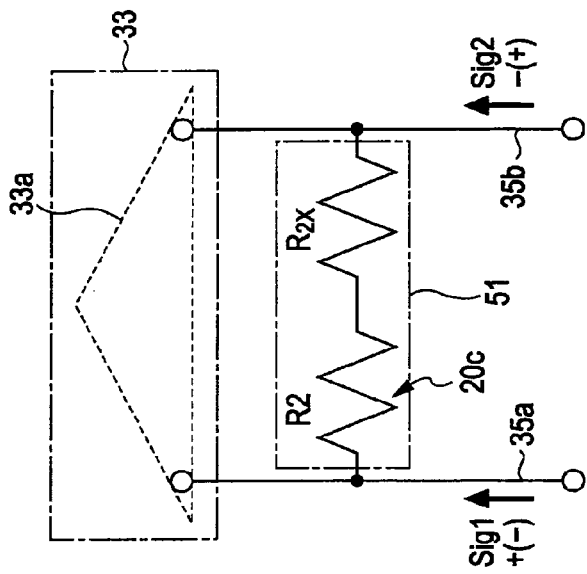
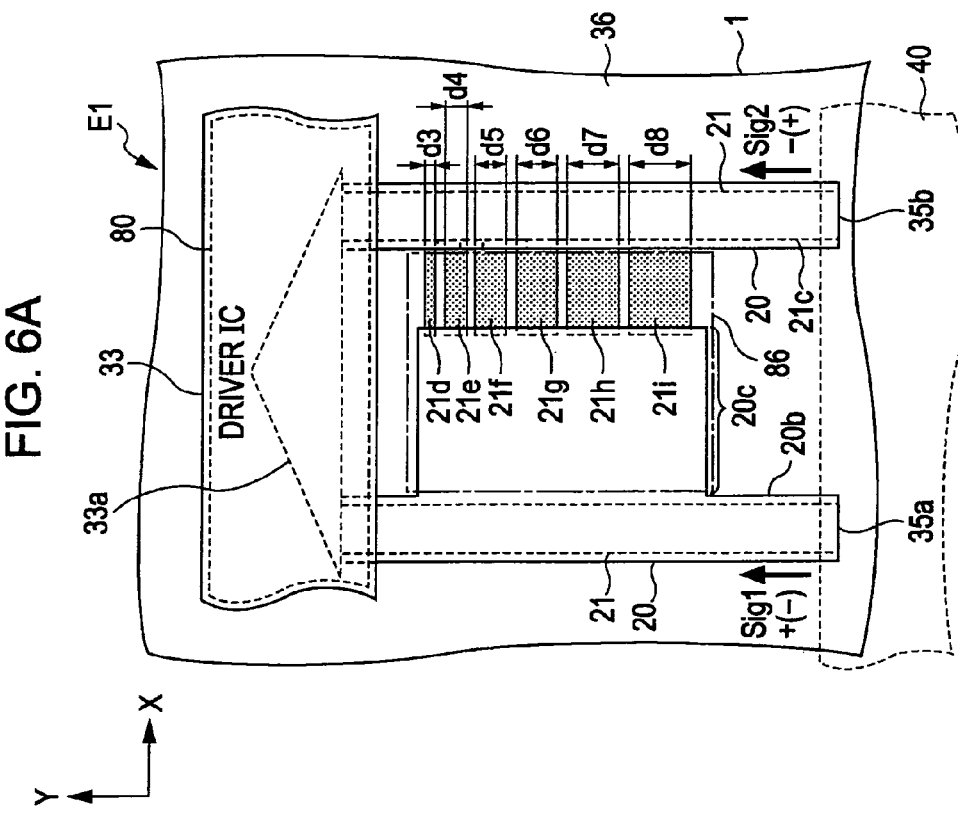

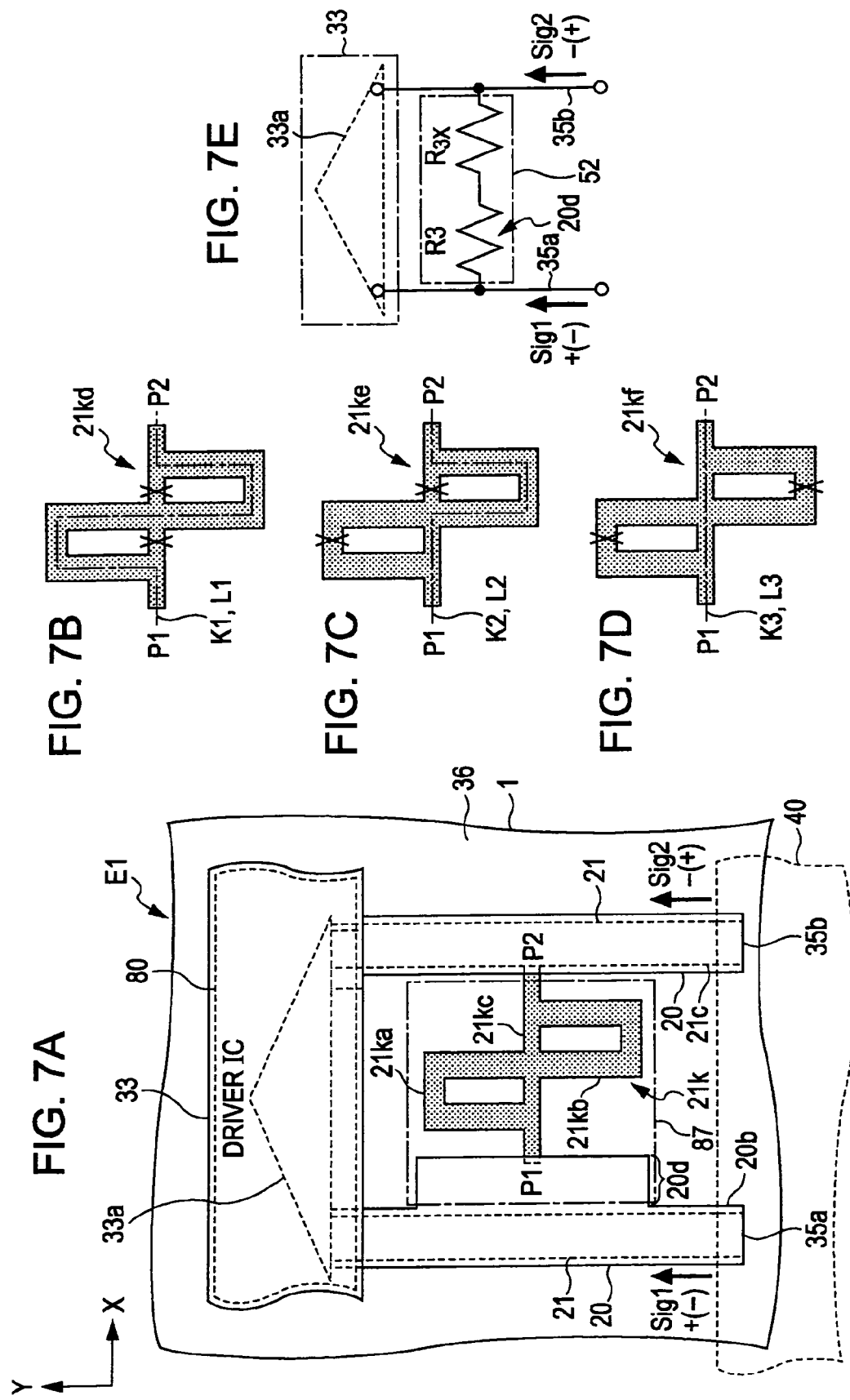

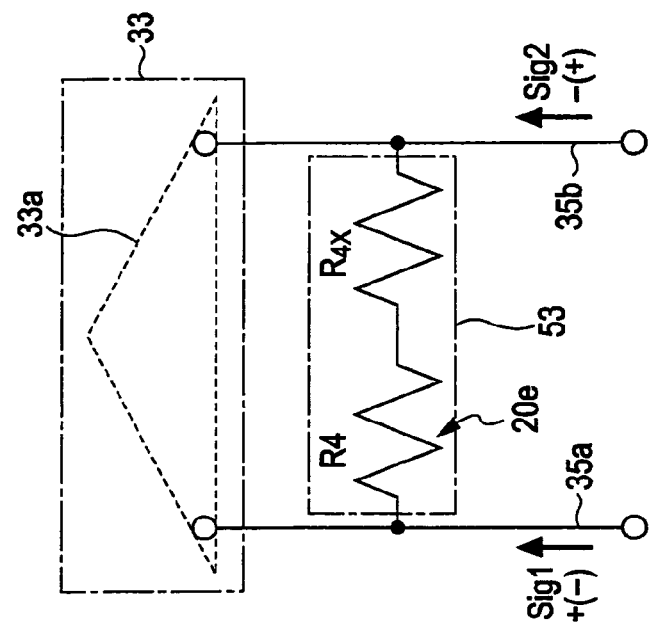
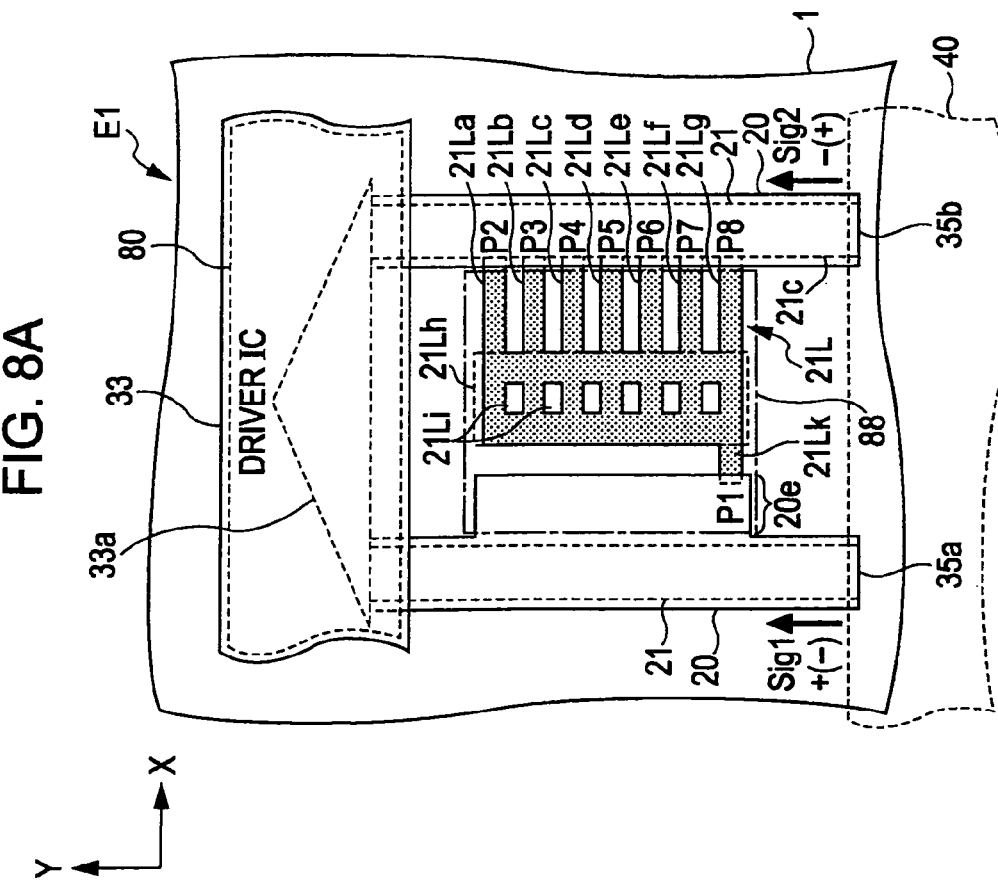

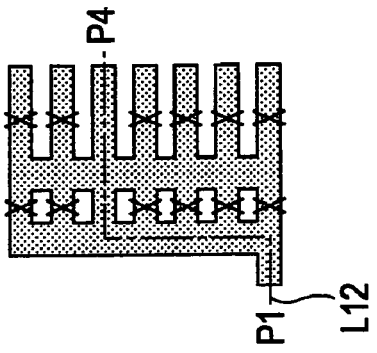
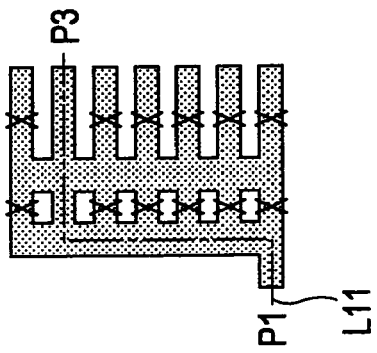
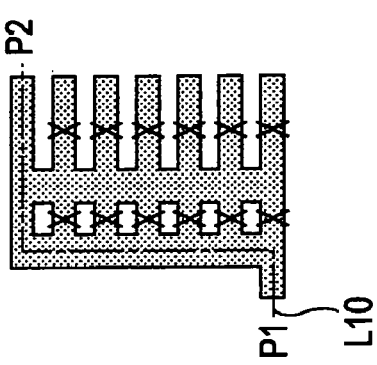
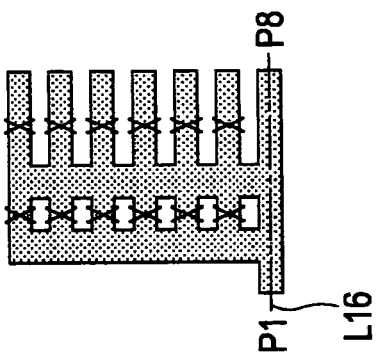
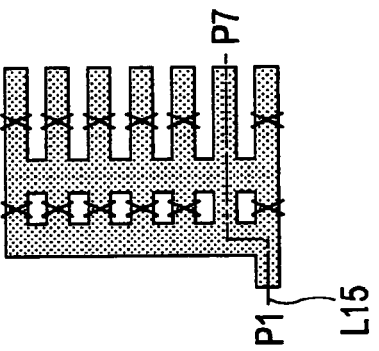
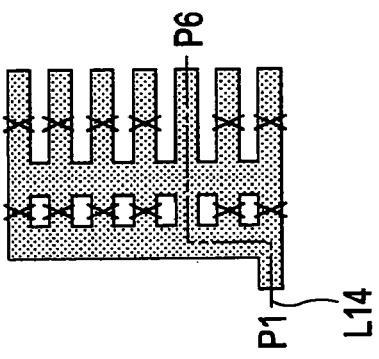
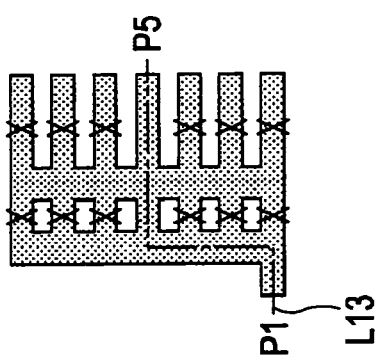

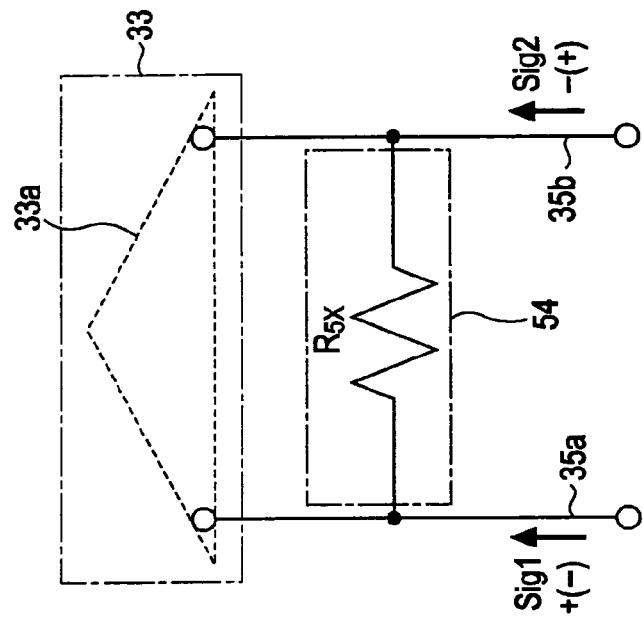
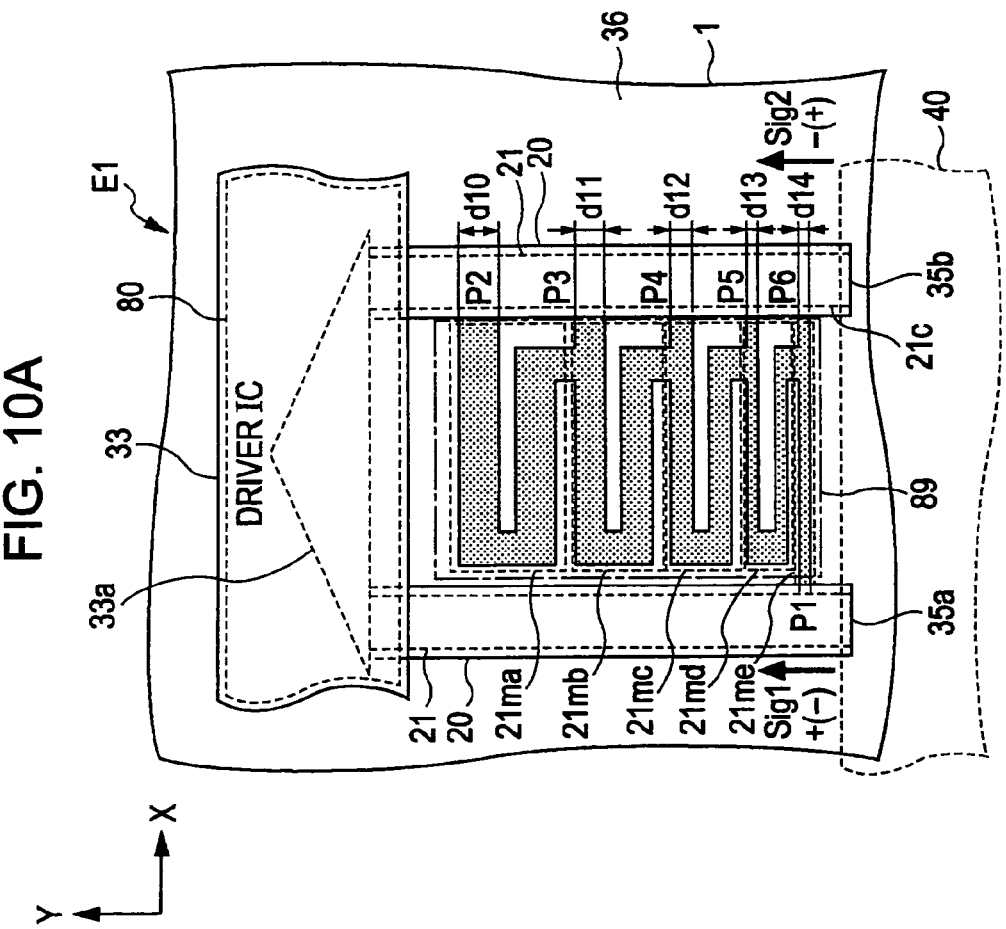

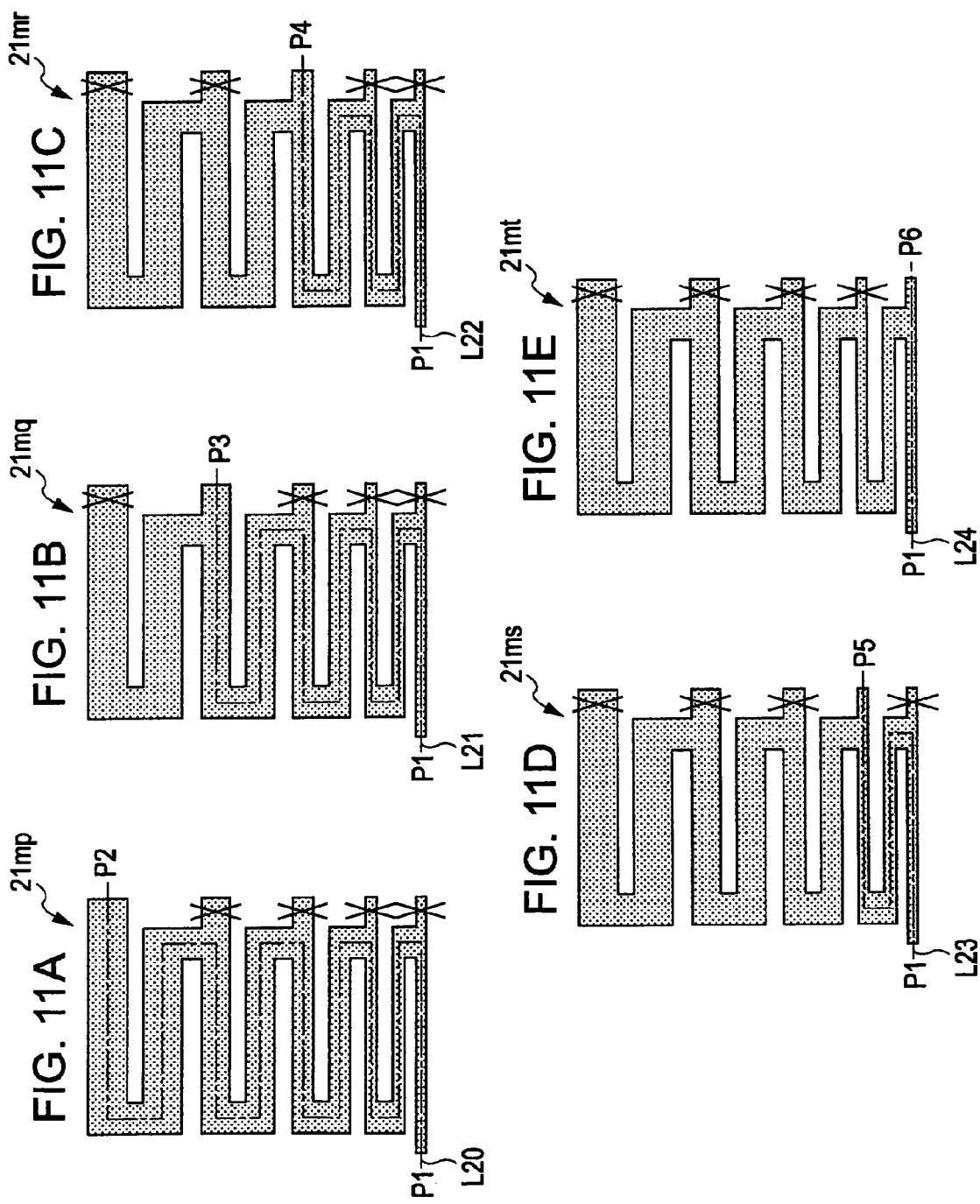

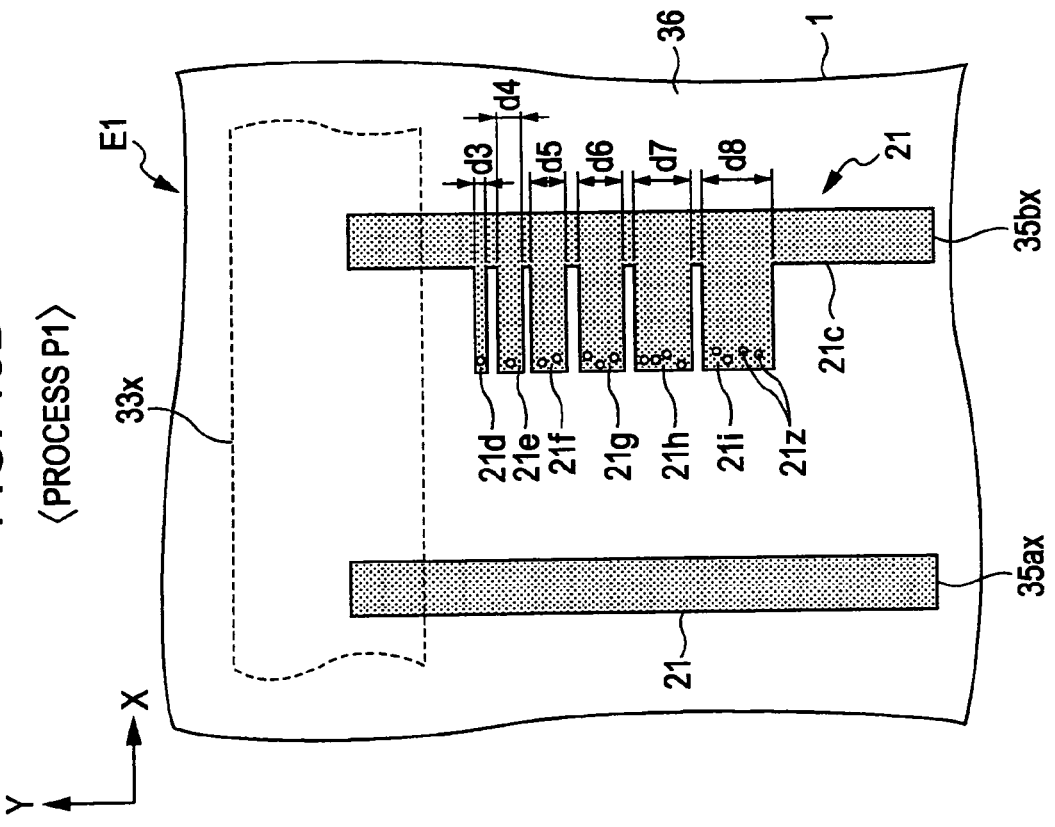
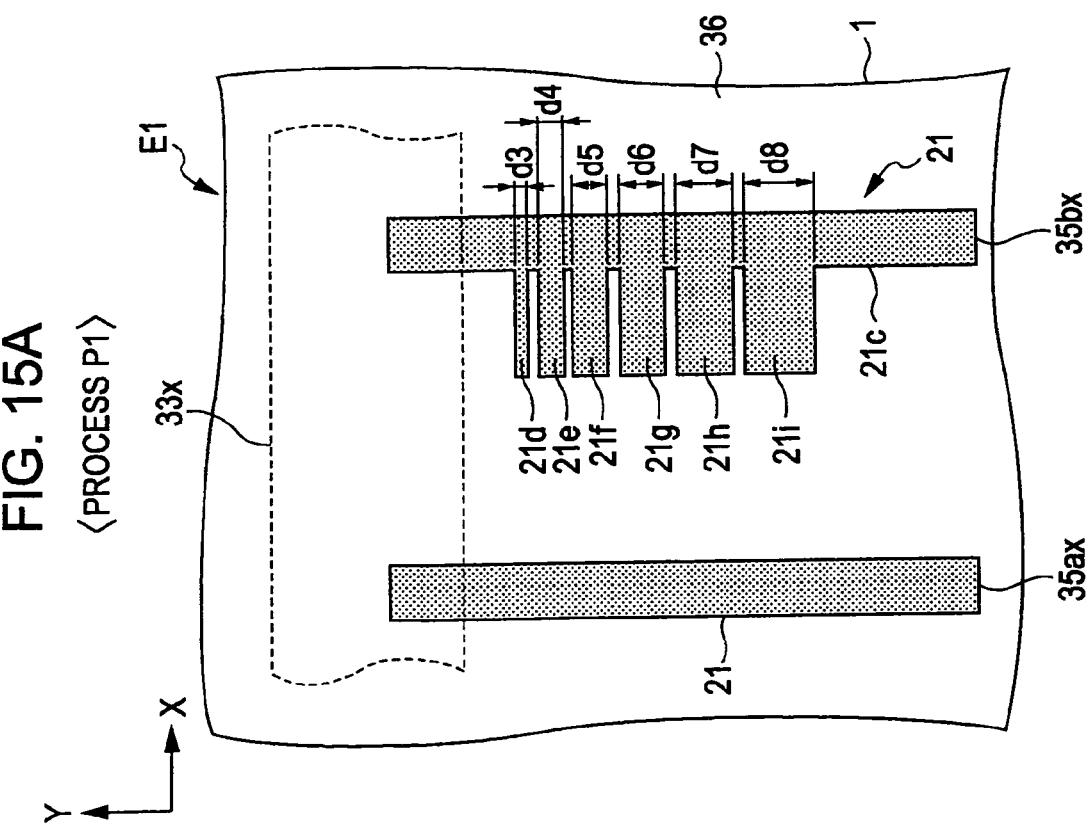

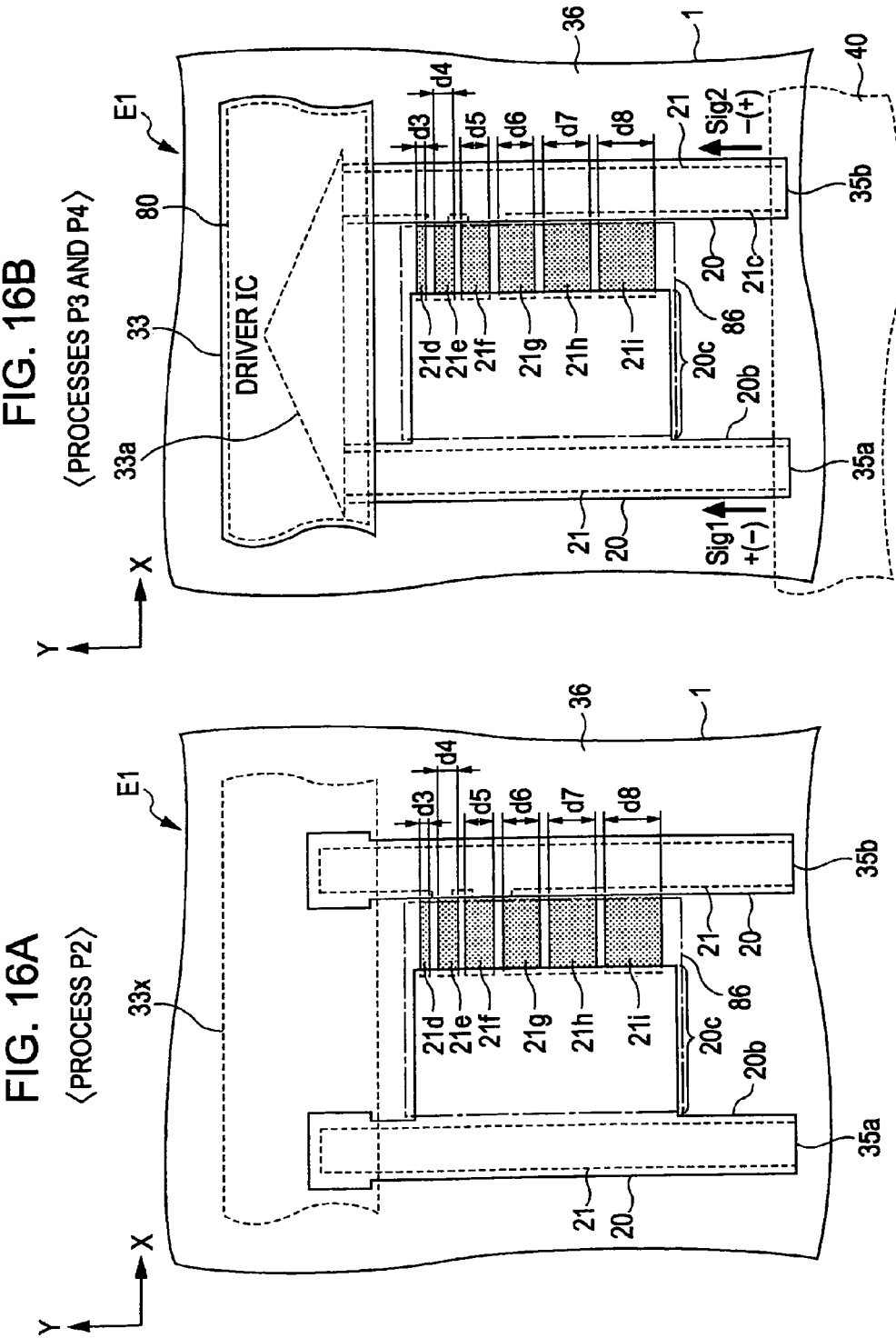

ELECTRO-OPTICAL DEVICE HAVING RESISTOR WITH ADJUSTABLE RESISTANCE VALUE CONNECTED TO IC AND WIRING LINES

This is a Divisional of U.S. patent application Ser. No. 11/437,800 filed on May 22, 2006, which is hereby incorporated by reference in its entirety. This application claims priority to Japanese Patent Application Nos. 2005-156677 filed May 30, 2005 and 2005-281392 filed Sep. 28, 2005, which are hereby incorporated by reference in their entirety.

BACKGROUND

1. Technical Field

The present invention relates to an electro-optical device and an electronic apparatus suitable for displaying various information items.

2. Related Art

Various electro-optical devices, such as a liquid crystal display device, an organic electroluminescent display device, a plasma display device, and a field emission display device, have been known in recent years. In the liquid crystal display device, which is an example of the electro-optical device, liquid crystal is injected between a substrate having, for example, a plurality of signal electrodes formed thereon and a counter substrate having, for example, a plurality of scanning electrodes formed thereon.

There has been disclosed a liquid crystal display device capable of accurately displaying an image having high brightness without any variation in output by providing a resistor pattern composed of an indium tin oxide (ITO) layer on the surface of a glass substrate and by trimming the resistor pattern on the surface of the glass substrate to reduce the resistance value thereof (for example, see JP-UM-A-6-36037).

In general, in the liquid crystal display device, the resistor pattern composed of the ITO layer having a large resistance value is removed to reduce the resistance value of the resistor pattern. Therefore, the liquid crystal display device has a limit in which it can minutely adjust the resistance value of the resistor pattern.

SUMMARY

An advantage of some aspects of the invention is that it provides an electro-optical device and an electronic apparatus having a terminating resistor capable of being easily trimmed to minutely adjust the resistance value thereof.

According to a first aspect of the invention, an electro-optical device includes: a substrate; a plurality of wiring lines which is formed on the substrate; and an IC which is mounted on the substrate so as to be electrically connected to the plurality of wiring lines. In the electro-optical device, at least a pair of wiring lines among the plurality of wiring lines include a first conductive layer formed on the substrate and a second conductive layer formed on at least the first conductive layer. The first conductive layer and the second conductive layer have different resistance values. The first conductive layer of one of the pair of wiring lines has a plurality of first resistors each extending toward the other wiring line, and the second conductive layer of the other wiring line has a second resistor extending toward the one wiring line. The plurality of first resistors is connected to the second resistor.

The electro-optical device includes a substrate formed of an insulating material, such as glass, a plurality of wiring lines formed on the substrate, and an IC, such as a driver IC, that is mounted on the substrate so as to be electrically connected to the plurality of wiring lines.

It is preferable that the first conductive layer be formed of at least an elemental metal or a metal compound and the second conductive layer be formed of a metal oxide. In addition, preferably, the elemental metal is Al or Cr, the metal compound is AlMo, and the metal oxide is ITO or IZO.

In the electro-optical device, at least a plurality of wiring lines among the plurality of wiring lines has a two-layer structure of the first conductive layer formed on the substrate and the second conductive layer formed on at least the first conductive layer. The first conductive layer and the second conductive layer have different resistance values. In addition, the first conductive layer of one of the pair of wiring lines has a plurality of first resistors extending toward the other wiring line, and the second conductive layer of the other wiring line has a second resistor extending toward the one wiring line.

In particular, in the electro-optical device, the plurality of first resistors is connected to the second resistor. That is, in the electro-optical device, it is possible to manufacture a resistor using two types of conductive layers having different resistance values, that is, the first conductive layer and the second conductive layer. A resistor composed of the plurality of first resistors and the second resistor connected to each other can be used as a terminating resistor for removing the distortion in signals transmitted to the IC through the pair of wiring lines. In this way, for example, when differential signals are output to the IC through the pair of wiring lines according to a differential transmission scheme, it is possible to make the resistor function as the terminating resistor which removes the distortion in signals transmitted to the IC through the pair of wiring lines. In addition, since the terminating resistor is formed on the substrate having an insulating property, it is possible to easily trim the terminating resistor by cutting or removing at least one of the first resistors, when the IC cannot receive suitable differential signals from an FPC through the pair of wiring lines due to a small resistance value of the terminating resistor and thus the resistance value of the terminating resistor needs to increase, at the time when the quality of the electro-optical device is tested. In this way, it is possible to easily manufacture a high-accuracy terminating resistor.

Here, the plurality of first resistors correspond to, in the following embodiments, a first conductive layer 21 including a first portion 21a and a second portion 21b shown in FIGS. 5A to 5C; a first conductive layer 21 including a first portion 21d, a second portion 21e, a third portion 21f, a fourth portion 21g, a fifth portion 21h, and a sixth portion 21i shown in FIGS. 6A and 6B; a first conductive layer 21 including a first portion 21ka, a second portion 21kb, and a third portion 21kc shown in FIGS. 7A to 7E; a first conductive layer 21 including a first portion 21La, a second portion 21Lb, a third portion 21Lc, a fourth portion 21Ld, a fifth portion 21Le, a sixth portion 21Lf, a seventh portion 21Lg, a ninth portion 21Lk, and an eighth portion 21Lh which has a plurality of openings 21Li and is formed in a rectangular shape shown in FIGS. 8A and 8B; or a first conductive layer 21 including a first portion 21ma, a second portion 21mb, a third portion 21mc, a fourth portion 21md, and a fifth portion 21me shown in FIGS. 10A and 10B. Meanwhile, the second resistor corresponds to, in the following embodiments, a second conductive layer 20a shown in FIGS. 5A to 5C, a second conductive layer 20c shown in FIGS. 6A and 6B, a second conductive layer 21d shown in FIGS. 7A to 7E, or a second conductive layer 20e shown in FIGS. 8A and 8B.

It is preferable that one end of each of the pair of wiring lines be connected to the IC and the other ends of the pair of wiring lines be connected to a flexible printed substrate (FPC). In addition, preferably, differential signals are input to the pair of wiring lines according to a differential transmission scheme. In this way, it is possible to output the differential signals from the FPC to the IC through the pair of wiring lines. Further, as described above, it is possible to reliably output suitable differential signals from the FPC to the IC through a pair of wiring lines by providing a high-accuracy terminating resistor between the pair of wiring lines by means of trimming.

Furthermore, in the electro-optical device according to this aspect, it is preferable that the plurality of first resistors have different line widths. In addition, preferably, the plurality of first resistors have a plurality of paths having different line widths.

In particular, it is preferable that the first conductive layer be formed of an elemental metal, such as Cr or Al, or a metal compound, such as AlMo, and the second conductive layer be formed of a metal oxide, such as ITO or IZO. In addition, preferably, the area of the second resistor occupies half or more of the entire area of a region where the plurality of first resistors and the second resistor are arranged.

According to a second aspect of the invention, an electro-optical device includes: a substrate; a plurality of wiring lines which is formed on the substrate and is formed of an elemental metal, a metal compound, or first and second conductive layers having different sheet resistance values; and an IC which is mounted on the substrate so as to be electrically connected to the plurality of wiring lines. In the electro-optical device, a resistor is provided between at least a pair of wiring lines among the plurality of wiring lines on the substrate so as to be connected to the pair of the wiring lines, and is formed of the same material as that used for the pair of wiring lines.

The electro-optical device includes a substrate formed of an insulating material, such as glass, a plurality of wiring lines which is formed on the substrate and is formed of an elemental metal, a metal compound, or first and second conductive layers having different sheet resistance values, and an IC, such as a driver IC, that is mounted on the substrate so as to be electrically connected to the plurality of wiring lines.

It is preferable that the first conductive layer be formed of at least an elemental metal or a metal compound and the second conductive layer be formed of a metal oxide. In addition, preferably, the elemental metal is Al or Cr, the metal compound is AlMo, and the metal oxide is ITO or IZO.

In particular, in the electro-optical device, a resistor is provided between at least a pair of wiring lines among the plurality of wiring lines on the substrate having an insulating property and is formed of the same material as that used for the pair of wiring lines. Here, it is preferable that differential signals be input to the pair of wiring lines according to a differential transmission scheme. In this way, for example, when differential signals are output to the IC through the pair of wiring lines according to the differential transmission scheme, it is possible to make the resistor function as a terminating resistor for removing the distortion of signals transmitted to the IC through the pair of wiring lines. In addition, since the resistor is formed on the substrate having an insulating property, it is possible to easily trim the resistor, when the IC cannot receive suitable differential signals from an FPC through the pair of wiring lines due to a small resistance value of the resistor, and thus the resistance value of the resistor needs to increase, at the time when the quality of the electro-optical device is tested. The term 'trimming' means a process of cutting or removing predetermined parts of a resistor using, for example, a laser or an etching technique to minutely adjust the resistance value of the resistor such that the resistance value increase (this meaning is similarly applied to the following description). In this way, it is possible to easily manufacture a high-accuracy resistor (terminating resistor).

It is preferable that one end of each of the pair of wiring lines be connected to the IC and the other ends of the pair of wiring lines be connected to a flexible printed substrate (FPC). In this way, it is possible to output the differential signals from the FPC to the IC through the pair of wiring lines. Further, it is possible to reliably output suitable differential signals from the FPC to the IC through the pair of wiring lines by providing a high-accuracy resistor (terminating resistor) between the pair of wiring lines by means of trimming.

Further, the resistor is formed of an elemental metal, a metal compound, or the same material as that used for the pair of wiring lines composed of the first conductive layer and the second conductive layer having different sheet resistance values. Preferably, the pair of wiring lines is integrally formed with the resistor, and a layer forming the resistor extends from one of the pair of wiring lines. In addition, the pair of wiring lines each have a laminated structure of the first conductive layer and the second conductive layer. In this way, it is unnecessary to provide an independent process of manufacturing the resistor when the electro-optical device is manufactured, which makes it possible to reduce the number of manufacturing processes. However, when trimming should be performed to manufacture a high-accuracy resistor (terminating resistor), it goes without saying that the number of manufacturing processes will increase by a number corresponding to the trimming.

In the electro-optical device according to this aspect, it is preferable that the resistor be provided in the vicinity of the IC. According to this structure, suitable differential signals can be output from the FPC to the IC without being affected by the resistance of the pair of wiring lines.

In the electro-optical device according to this aspect, preferably, when the IC is mounted on the substrate with an anisotropic conductive film interposed therebetween, the resistor is provided so as not to contact the anisotropic conductive film protruding from the periphery of the IC to the outside. According to this structure, when the IC is mounted on the substrate with the anisotropic conductive film (ACF) interposed therebetween, it is possible to reliably prevent the resistor from being electrically connected to the anisotropic conductive film at the time of the driving of the electro-optical device even when the anisotropic conductive film protrudes from the periphery of the IC to the outside.

In general, the sheet resistance value of ITO is about $50\Omega \pm 30\%/\text{sq}$, and the sheet resistance value of IZO is about $37\ \Omega/\text{sq}$. In addition, the sheet resistance value of Cr is about $1.3\Omega \pm 0.4\%/\text{sq}$, the sheet resistance value of Al is about $0.24\ \Omega/\text{sq}$, and the sheet resistance value of AlMo is about $0.36\ \Omega/\text{sq}$.

Therefore, for example, it is possible to set the total resistance value of the resistor by using the second resistor having a large sheet resistance value, which is a component of the other wiring line. Meanwhile, it is possible to minutely adjust the resistance value of the resistor so as to increase the resistance value by trimming at least one of the first resistors having different line widths, which are components of the one wiring line, or by trimming arbitrary parts of the plurality of paths of the first resistors having different line widths. As a result, it is possible to easily manufacture a high-accuracy resistor.

Further, according to a third aspect of the invention, an electronic apparatus includes the above-mentioned electro-optical device as a display unit.

Furthermore, according to a fourth aspect of the invention, a method of manufacturing an electro-optical device includes: forming a plurality of wiring lines on a substrate; mounting an IC on the substrate so as to be electrically connected to the plurality of wiring lines, at least a pair of wiring lines among the plurality of wiring lines including a first conductive layer formed on the substrate and a second conductive layer formed on at least the first conductive layer, the first conductive layer and the second conductive layer having different resistance values, the first conductive layer of one of the pair of wiring lines having a plurality of first resistors each extending toward the other wiring line, and the second conductive layer of the other wiring line having a second resistor extending toward the one wiring line; connecting the plurality of first resistors to the second resistor; and cutting at least one of the plurality of first resistors.

In the method of manufacturing an electro-optical device, in the first process, a plurality of wiring lines is formed on a substrate having an insulating property. In the second process, an IC is mounted on the substrate so as to be electrically connected to the plurality of wiring lines. In the third process, at least one of the plurality of first resistors is cut, if necessary, in the following structure: at least a pair of wiring lines among the plurality of wiring lines have a laminated structure of a first conductive layer formed on the substrate and a second conductive layer formed on at least the first conductive layer; the first conductive layer and the second conductive layer have different resistance values; the first conductive layer of one of the pair of wiring lines has a plurality of first resistors extending toward the other wiring line; the second conductive layer of the other wiring line has a second resistor extending toward the one wiring line; and the plurality of first resistors is connected to the second resistor.

It is preferable that the first conductive layer be formed of at least an elemental metal or a metal compound, and the second conductive layer be formed of a metal oxide. In addition, preferably, the elemental metal is Al or Cr, the metal compound is AlMo, and the metal oxide is ITO or IZO.

Therefore, it is possible to easily trim a resistor (terminating resistor) by cutting at least one of the first resistors in the process of cutting at least one of the plurality of first resistors, when the IC cannot receive suitable differential signals from an FPC through the pair of wiring lines according to a differential transmission scheme, due to a small resistance value of the resistor having the plurality of first resistors and the second resistor connected to each other, and thus the resistance value of the terminating resistor needs to increase, at the time when the quality of the electro-optical device is tested. In this way, it is possible to easily manufacture a high-accuracy terminating resistor.

According to a fifth aspect of the invention, an electro-optical device includes: an insulating substrate; a plurality of wiring lines which is formed on the substrate; and an IC which is mounted on the substrate so as to be electrically connected to the plurality of wiring lines. In the electro-optical device, a resistor is provided between at least a pair of wiring lines of the plurality of wiring lines so as to be connected to the pair of wiring lines, and the resistor includes resistors having a plurality of paths with different line widths or different line lengths, or resistors having a plurality of paths with different line widths and lengths.

According to a sixth aspect of the invention, an electro-optical device includes: a substrate which is formed of an insulating material, such as glass; a plurality of wiring lines which is formed on the substrate; and an IC, such as a driving IC, which is mounted on the substrate so as to be electrically connected to the plurality of wiring lines.

In this structure, it is preferable that one end of each of the pair of wiring lines be connected to the IC and the other ends of the pair of wiring lines be connected to a flexible printed substrate (FPC). In addition, preferably, differential signals are input to the pair of wiring lines according to a differential transmission scheme. In this way, it is possible to output the differential signals from the FPC to the IC through the pair of wiring lines according to the differential transmission scheme.

In particular, in the electro-optical device according to this aspect, a resistor is provided between at least a pair of wiring lines among the plurality of wiring lines on the insulating substrate so as to be connected to the pair of wiring lines, and the resistor includes resistors having a plurality of paths with different line widths or line lengths or resistors having a plurality of paths with different line widths and line lengths. Therefore, it is possible to make the resistor function as a terminating resistor for removing the distortion of signals transmitted to the IC through the pair of wiring lines. In addition, since the resistor is formed on the substrate having an insulating property, it is possible to easily trim the resistor, when the IC cannot receive suitable differential signals from an FPC through the pair of wiring lines due to a small resistance value of the resistor and thus the resistance value of the resistor needs to increase, at the time when the quality of the electro-optical device is tested. In this way, it is possible to easily manufacture a high-accuracy terminating resistor. The term 'trimming' means a process of cutting or removing predetermined parts of a resistor using, for example, a laser or an etching technique to minutely adjust the resistance value of the resistor such that the resistance value increases (this meaning is similarly applied to the following description). In this way, it is possible to easily manufacture a high-accuracy resistor (terminating resistor).

Further, it is possible to reliably output suitable differential signals from the FPC to the IC through a pair of wiring lines by providing a high-accuracy resistor (terminating resistor) between the pair of wiring lines by means of trimming.

In the electro-optical device according to this aspect, preferably, the resistor includes a first resistor that is integrally formed with one of the pair of wiring lines and a second resistor that is integrally formed with the other wiring line so as to be connected to the first resistor, and the first resistor has a plurality of branched paths connecting two predetermined points between the one wiring line and the second resistor.

According to this structure, the resistor includes the first resistor that is integrally formed with one of the pair of wiring lines and the second resistor that is integrally formed with the other wiring line so as to be connected to the first resistor, and the first resistor has a plurality of branched paths connecting two predetermined points between the one wiring line and the second resistor. Therefore, it is possible to easily manufacture a high-accuracy resistor (terminating resistor) by cutting (trimming) at least one of the plurality of branched paths of the first resistor, when the IC cannot receive suitable differential signals from an FPC through the pair of wiring lines due to a small resistance value of the resistor and thus the resistance value of the resistor needs to increase, at the time when the quality of the electro-optical device is tested. In this case, in the terminating resistor, at least a portion of the first resistor is cut.

In the electro-optical device according to this aspect, preferably, the resistor includes a first resistor that is integrally formed with one of the pair of wiring lines and a second resistor that is integrally formed with the other wiring line so as to be connected to the first resistor. In addition, preferably, the first resistor includes a plurality of resistors extending from the one wiring line and a resistor that is connected to the plurality of resistors and the second resistor and has openings at positions corresponding to the plurality of resistors.

According to this structure, the resistor includes the first resistor that is integrally formed with one of the pair of wiring lines and the second resistor that is integrally formed with the other wiring line so as to be connected to the first resistor. In addition, the first resistor includes the plurality of resistors extending from the one wiring line and the resistor that is connected to the plurality of resistors and the second resistor and has the openings at the positions corresponding to the plurality of resistors. Therefore, it is possible to easily manufacture a high-accuracy resistor (terminating resistor) by cutting (trimming) at least one of the plurality of resistors and the resistor having the openings therein of the first resistor, when the IC cannot receive suitable differential signals from an FPC through the pair of wiring lines due to a small resistance value of the resistor and thus the resistance value of the resistor needs to increase, at the time when the quality of the electro-optical device is tested. In this case, in the terminating resistor, at least one of the plurality of resistors and the resistor having the openings therein is cut.

In the electro-optical device according to this aspect, preferably, the resistor is integrally formed with one of the wiring lines and is connected to the one of the wiring lines through a plurality of paths.

According to this structure, the resistor is integrally formed with one of the wiring lines and is connected to the one of the wiring lines through a plurality of paths. Therefore, it is possible to easily manufacture a high-accuracy resistor (terminating resistor) by cutting (trimming) at least a portion of the resistor, when the IC cannot receive suitable differential signals from an FPC through the pair of wiring lines due to a small resistance value of the resistor and thus the resistance value of the resistor needs to increase, at the time when the quality of the electro-optical device is tested. In this case, in the terminating resistor, at least a portion of the resistor is cut.

In the electro-optical device according to this aspect, it is preferable that the resistor be provided in the vicinity of the IC. According to this structure, it is possible to output suitable differential signals from an FPC to the IC without being affected by the resistance of the pair of wiring lines.

In the electro-optical device according to this aspect, preferably, when the IC is mounted on the substrate with an anisotropic conductive film interposed therebetween, the resistor is provided so as not to contact the anisotropic conductive film protruding from the periphery of the IC to the outside. According to this structure, when the IC is mounted to the substrate with an anisotropic conductive film (ACF) interposed therebetween, it is possible to reliably prevent the resistor from being electrically connected to the anisotropic conductive film at the time of the driving of the electro-optical device even when the anisotropic conductive film protrudes from the periphery of the IC to the outside.

According to an eighth aspect of the invention, an electronic apparatus includes the above-mentioned electro-optical device as a display unit.

Furthermore, according to a ninth aspect of the invention, a method of manufacturing an electro-optical device includes: forming on an insulating substrate a plurality of wiring lines including a plurality of resistors having different line widths or line lengths or a plurality of resistors having different line widths and line lengths; and mounting an IC on the substrate so as to be electrically connected to the plurality of wiring lines. The forming of the wiring lines includes: integrally forming the plurality of resistors with at least a pair of wiring lines among the plurality of wiring lines such that the plurality of resistors is provided between the pair of wiring lines; and cutting at least one of the plurality of resistors.

In the method of manufacturing an electro-optical device according to this aspect, in the first process, a plurality of wiring lines including a plurality of resistors having different line widths or line lengths or a plurality of resistors having different line widths and line lengths are formed on an insulating substrate. In the forming of the wiring lines, the plurality of resistors is integrally formed with at least a pair of wiring lines among the plurality of wiring lines such that the plurality of resistors is provided between the pair of wiring lines. In this way, it is possible to make the plurality of resistors to function as a terminating resistor.

In the next process, an IC is mounted on the substrate so as to be electrically connected to the plurality of wiring lines. In this way, it is possible to output differential signals to the pair of wiring lines through the IC according to a differential transmission scheme.

In particular, the method of manufacturing an electro-optical device according to this aspect further includes cutting at least one of the plurality of resistors.

Therefore, it is possible to easily manufacture a terminating resistor by cutting at least one of the plurality of resistors, when the IC cannot receive suitable differential signals from an FPC through the pair of wiring lines according to the differential transmission scheme due to small resistance values of the plurality of resistors (terminating resistor) and thus the resistance value of the terminating resistor needs to increase, at the time when the quality of the electro-optical device manufactured according to this aspect is tested. In this way, it is possible to easily manufacture a high-accuracy terminating resistor.

BRIEF DESCRIPTION OF THE DRAWINGS

The invention will be described with reference to the accompanying drawings, wherein like numbers refer to like elements.

FIG. 5A is an enlarged partial plan view illustrating the vicinity of a driving IC mounted on the element substrate according to the first embodiment of the invention.

FIG. 5B is a cross-sectional view taken long the line VB-VB of FIG. 5A.

FIG. 5C is an equivalent circuit diagram illustrating the driving IC and a terminating resistor shown in FIG. 5A.

FIG. 6A is an enlarged partial plan view illustrating the vicinity of a driving IC according to another structure of the first embodiment.

FIG. 6B is an equivalent circuit diagram illustrating the driving IC and a terminating resistor shown in FIG. 6A.

FIG. 7A is an enlarged partial plan view illustrating the vicinity of a driving IC according to a second embodiment of the invention.

FIGS. 7B to 7D are enlarged views illustrating only a wiring pattern.

FIG. 7E is an equivalent circuit diagram illustrating the driving IC and a terminating resistor shown in FIG. 7A.

FIG. 8A is an enlarged partial plan view illustrating the vicinity of a driving IC according to another structure of the second embodiment of the invention.

FIG. 8B is an equivalent circuit diagram illustrating the driving IC and a terminating resistor shown in FIG. 8A.

FIGS. 9A to 9G are enlarged partial plan views illustrating examples of terminating resistors according to another structure of the second embodiment of the invention.

FIG. 10A is an enlarged partial plan view illustrating the vicinity of a driving IC formed on an element substrate according to a third embodiment of the invention.

FIG. 10B is an equivalent circuit diagram illustrating the driving IC and a terminating resistor shown in FIG. 10A.

FIGS. 11A to 11E are enlarged partial plan views illustrating examples of terminating resistors according to the third embodiment of the invention.

FIGS. 15A and 15B are enlarged partial plan views illustrating processes of manufacturing components around a driving IC on an element substrate according to an embodiment of the invention.

FIGS. 16A and 16B are enlarged partial plan views illustrating processes of manufacturing components around a driving IC on an element substrate according to another embodiment of the invention.

DESCRIPTION OF EXEMPLARY EMBODIMENTS

Hereinafter, preferred embodiments of the invention will be described below with reference to the accompanying drawings. In the following embodiments, the invention is applied to a liquid crystal display device, which is an example of an electro-optical device.

First Embodiment

Structure of Liquid Crystal Display Device

Figure 1:
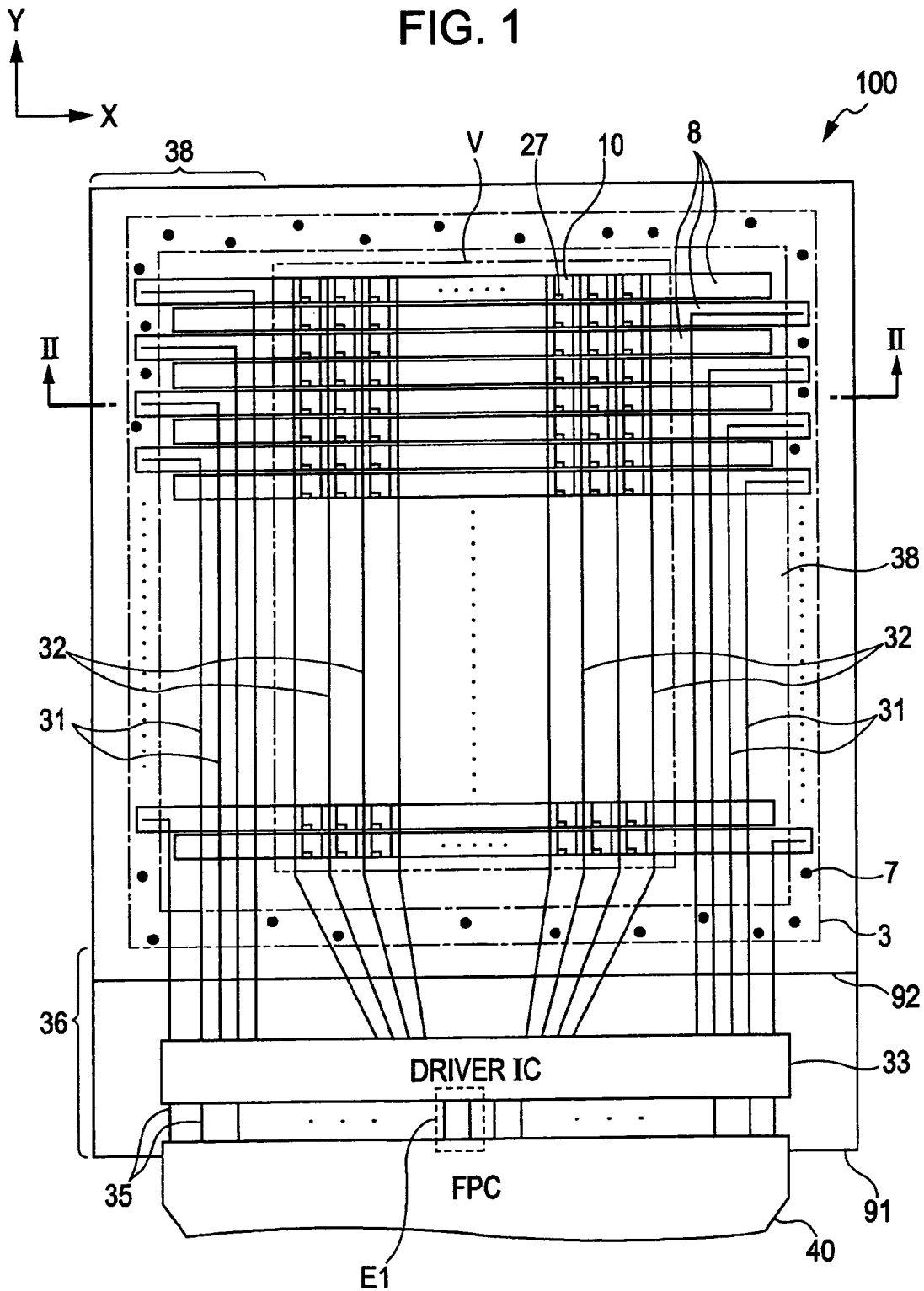
FIG. 1 is a plan view schematically illustrating the structure of a liquid crystal display device according to a first embodiment of the invention.

First, the structure of a liquid crystal display device according to a first embodiment of the invention will be described below. FIG. 1 is a plan view schematically illustrating the structure of a liquid crystal display device 100 according to the first embodiment of the invention. FIG. 1 mainly shows the structure of electrodes and wiring lines of the liquid crystal display device 100 in plan view. The liquid crystal display device 100 of the first embodiment is an active matrix driving type using thin film diodes (TFDs) and a transmissive type.

Figure 2:
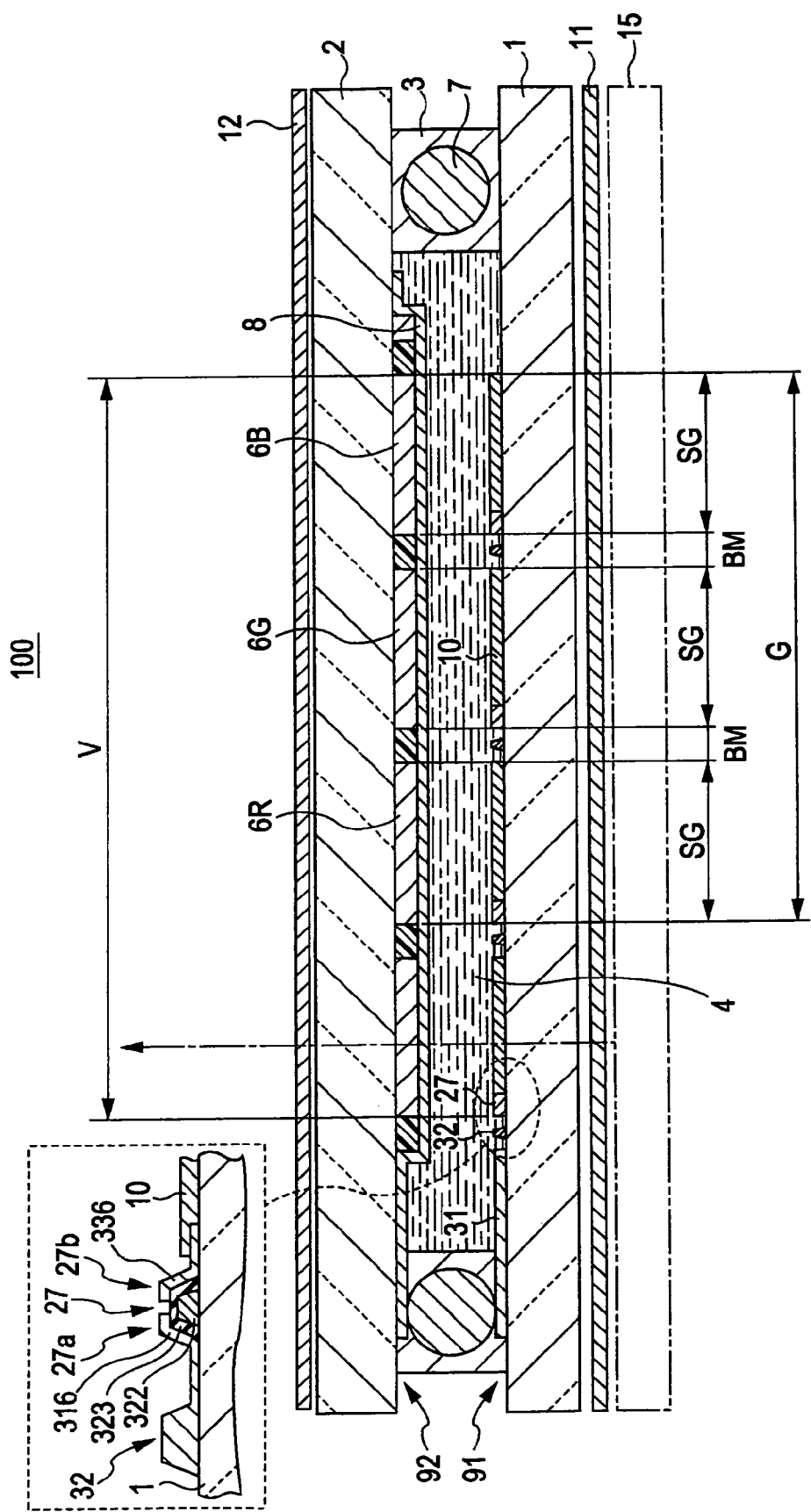
FIG. 2 is a cross-sectional view taken along the line II-II of FIG. 1.

FIG. 2 is a schematic cross-sectional view of the liquid crystal display device 100, taken along the line II-II of FIG. 1.

First, the sectional-view structure of the liquid crystal display device 100 will be described with reference to FIG. 2, and then the structure of the electrodes and the wiring lines of the liquid crystal display device 100 will be described.

In FIG. 2, the liquid crystal display device 100 includes an element substrate 91, a color filter substrate 92 arranged opposite to the element substrate 91, a frame-shaped sealing member 3 for bonding the substrates, and a liquid crystal layer 4 formed by injecting liquid crystal into the sealing member 3. Conductive members 7, such as a plurality of metal particles, are dispersed in the frame-shaped sealing member 3.

A lower substrate 1 is formed of an insulating material, such as glass. Sub-pixel regions SG are formed on an inner surface of the lower substrate 1, and a TFD element 27 and a pixel electrode 10 formed of a transparent conductive material (metal oxide), such as ITO (indium tin oxide) or IZO (indium zinc oxide), are formed in each of the sub-pixel regions SG. Data line 32 formed of elemental metal, such as Cr (chrome) or Al (aluminum), or a metal compound, such as AlMo (aluminum molybdenum), are formed adjacent pixel electrodes 10 on the inner surface of the lower substrate 1. Each of the data lines 32 is electrically connected to the corresponding TFD element 27, and each of the TFD elements 27 is electrically connected to the corresponding pixel electrode 10.

As shown in FIG. 2 as an enlarged region represent by a dashed line, the TFD element 27 includes a first TFD element 27a and a second TFD element 27b. The first and second TFT elements 27a and 27b have a first metal film 322 which has an island shape and is formed of, for example, TaW (tantalum tungsten) having tantalum as a main ingredient, an insulating film 323 which is formed by anodizing the surface of the first metal film 322 and is made of $Ta_2O_5$ (tantalum oxide), and second metal films 316 and 336 which are formed on the insulating film so as to be separated from each other. The second metal films 316 and 336 are formed by patterning a conductive material including an elemental metal, such as Cr (chrome) or Al (aluminum), or a metal compound, such as AlMo (aluminum molybdenum). The second metal film 316 is branched from the data line 32 in a T shape, and the second metal film 336 is connected to the pixel electrode 10.

In the TFD element 27, the first TFD element 27a has the second metal film 316, the insulating film 323, and the first metal film 322 laminated in this order, as viewed from the data line 32. That is, the first TFD element 27a has a laminated structure of a metal film, an insulating film, and a metal film. Therefore, the first TFD element 27a has a non-linear voltage-current characteristic in both negative and positive directions. Meanwhile, the second TFD element 27b has the first metal film 322, the insulating film 323, and the second metal film 336 laminated in this order, as viewed from the data line 32. That is, the second TFD element 27b has a laminated structure reverse to that of the first TFD element 27a. Therefore, the current-voltage characteristics of the second TFD element 27b and the first TFD element 27a are symmetric with respect to the origin. As a result, the TFD element 27 is composed of two TFD elements connected in series to each other in the reverse direction, causing the non-linear current-voltage characteristic to be symmetric in both the positive and negative directions, as compared with a structure in which one TFD element is used.

Further, wiring lines 31 are formed on the left and right sides of the inner surface of the lower substrate 2. End portions of the wiring lines 31 extend into the sealing member 3 to be electrically connected to the conductive members 7.

Meanwhile, an upper substrate 2 is formed of the same material as that used for the lower substrate 1. R (red), G (green), and B (blue) colored layers 6R, 6G, and 6B are formed in each of the sub-pixel regions SG on an inner surface of the upper substrate 2. The colored layers 6R, 6G, and 6B form a color filter. A pixel region G indicates a region corresponding to one color pixel composed of R, G, and B sub-pixel regions SG. In the following description, when the colored layers are represented regardless of the colors thereof, they are simply denoted as 'colored layers 6'. On the other hand, when the colors of the colored layers should be distinguished from each other, the colored layers are denoted as, for example, 'colored layers 6R'. A black light-shielding layer BM is formed at boundaries between the colored layers on the inner surface of the upper substrate 2. The black light-shielding layer BM may be formed of a black resin material, such as a material formed by dispersing a black pigment in resin. In this embodiment of the invention, a laminated light-shielding layer (not shown) of the R, G, and B colored layers may be used instead of the black light-shielding layer. Scanning electrodes 8 made of the same material as that used for the pixel electrode 10 are formed on a part of the upper substrate 2, that is, on the colored layers 6 and the inner surface of the black light-shielding layer. One end of each of the scanning electrodes extends into the sealing member 3 so as to be electrically connected to the conductive members 7. As a result, the scanning electrodes 8 of the upper substrate 2 are electrically connected to the wiring lines 31 formed on the lower substrate 1 by the conductive members 7 dispersed in the sealing member 3.

A polarizing plate 11 is arranged on an outer surface of the lower substrate 1, and a polarizing plate 12 is arranged on an outer surface of the upper substrate 2. Further, a backlight 15, serving as an illuminating device, is arranged below the polarizing plate 11. The backlight 15 may be formed by combining a point light source, such as an LED (light emitting diode), or a line light source, such as a cold cathode fluorescent lamp, with an optical waveguide.

When transmissive display is performed in the liquid crystal display device 100 of the first embodiment, illumination light emitted from the backlight 15 travels along a path T shown in FIG. 2. That is, illumination light emitted from the backlight 15 passes through the pixel electrode 10, the liquid crystal layer 4, and the colored layer 6 to have a predetermined color and brightness and then reaches a viewer. As a result, the viewer can see a desired color display image.

Structure of Electrodes and Wiring Lines

Next, the structure of the electrodes and the wiring lines of the element substrate 91 and the color filter substrate 92 according to the first embodiment of the invention will be described below with reference to FIGS. 1, 3, and 4.

Figure 3:
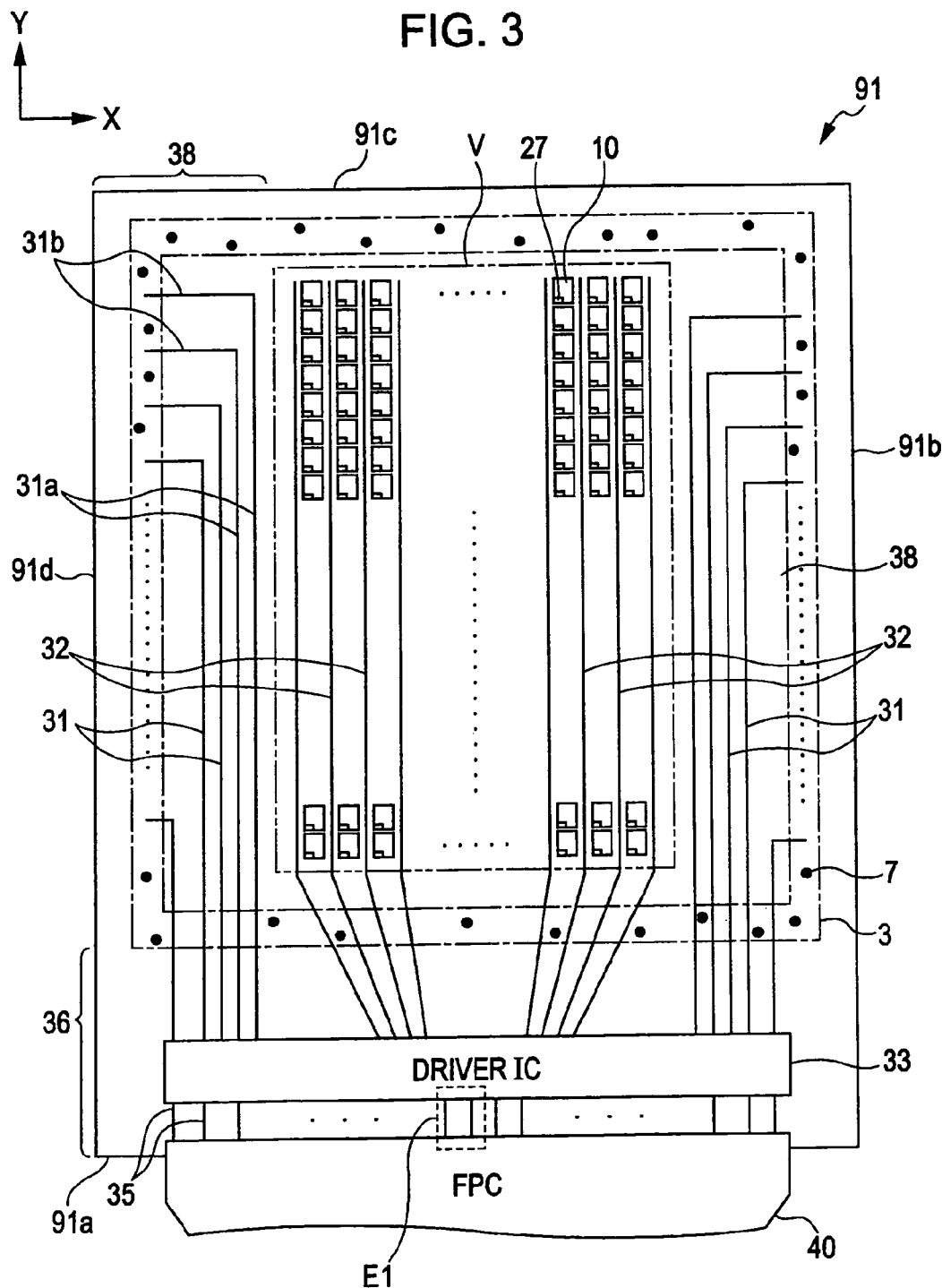
FIG. 3 is a plan view illustrating the structure of an element substrate according to the first embodiment of the invention.

FIG. 3 is a plan view illustrating the structure of, for example, the electrodes and the wiring lines of the element substrate 91, as viewed from the front side (that is, the upper side of FIG. 2). FIG. 4 is a plan view illustrating the structure of, for example, the electrodes and the wiring lines of the color filter substrate 92, as viewed from the front side (that is, the lower side of FIG. 2). In FIGS. 3 and 4, components other than the electrodes and the wiring lines are not shown for the purpose of simplicity of the description. In FIG. 3, a direction from a side 91a of the element substrate 91 close to a projecting region 36 to a side 91c opposite to the side 91a is referred to as a Y direction, and a direction from a side 91d to a side 91b is referred to as an X direction.

In FIG. 1, intersections of the pixel electrodes 10 of the element substrate 91 and the scanning electrodes 8 of the color filter substrate 92 form the sub-pixel regions SG, which are minimum display units. An effective display region V (a region surrounded by a two-dot chain line) is composed of a plurality of sub-pixel regions SG arranged in a matrix in the vertical and horizontal directions of the plane of the drawing. For example, characters, numbers, and figures are displayed in the effective display region V. In FIGS. 1 and 3, a region partitioned by the periphery of the liquid crystal display device 100 and the effective display region V is a frame region 38 not contributing to image display.

First, the structure of the electrodes and the wiring lines of the element substrate 91 will be described below. The element substrate 91 includes a plurality of data lines 32, the TFD elements 27, the pixel electrodes 10, a plurality of wiring lines 31, a driver IC 33, a plurality of external connection wiring lines 35, and a flexible printed circuit (FPC) 40.

The plurality of data lines 32 are formed so as to extend from the projecting region 36 having the driver IC 33 mounted therein to the effective display region V. The data lines 32 are formed at predetermined intervals, and are electrically connected to the TFD elements 27. The TFD elements 27 are electrically connected to the corresponding pixel electrodes 10. In this way, each of the data lines 32 is electrically connected to the pixel electrode 10 through the TFT element 27.

The plurality of wiring lines 31 each has a main line portion 31a and a curved line portion 31b curved substantially at a right angle with respect to the main line portion 31a. The main line portion 31a is formed in the frame region 38 so as to extend from the projecting region 36 in the Y direction. The curved line portion 31b extends from one end of the corresponding main line portion 31a into the sealing member 3 positioned along the sides 91d and 91b. The end portions of the curved line portions 31b are electrically connected to the conductive members 7 in the sealing member 3.

The driving IC 33 and the external connection wiring lines 35 are mounted on the projecting region 36 provided on the side 91a of the element substrate 91.

Input terminals of the driving IC 33 are electrically connected to the external connection wiring lines 35 through an anisotropic conductive film (ACF), and output terminals of the driver IC 33 are electrically connected to the plurality of data lines 32 and the scanning electrodes 8. As shown in FIGS. 5A to 5C, the driver IC 33 has a receiver 33a, and the receiver 33a receives, through a pair of external connection wiring lines 35a and 35b, differential signals transmitted from the FPC 40 by a differential transmission scheme. Here, the differential transmission scheme means a system in which two-phase signals, that is, a plus signal and a minus signal, which is an inverted signal of the pulse signal, are generated from one signal and then transmitted through two signal lines. The use of this system makes it possible to transmit data having low amplitude at a speed higher than 500 MHz.

The FPC 40 includes a plurality of input and output wiring lines (not show). The input wiring lines are electrically connected to an electronic apparatus, such as a cellular phone or an information terminal, and the output wiring lines are electrically connected to the plurality of external connection wiring lines 35 through the AFC.

In the element substrate 91 having the above-mentioned electrode and wiring line structures, data signals and scanning signals are respectively output from an electronic apparatus to the plurality of data lines 32 and the plurality of scanning electrodes 8 through, for example, the FPC 40 and the driver IC 33.

Next, the structure of the electrodes of the color filter substrate 92 will be described below. As shown in FIG. 4, the color filter substrate 92 includes a plurality of scanning electrodes 8. The scanning electrodes 8 are formed in strip shapes and extend in the X direction at predetermined intervals. As shown in FIGS. 1 and 4, a right or left end of each of the scanning electrodes 8 extend into the sealing member 3 so as to be electrically connected to the conductive members 7.

As described above, FIG. 1 shows the element substrate 91 and the color filter substrate 92 bonded to each other with the sealing member 3 interposed therebetween. As shown in FIG. 1, the scanning electrodes 8 of the color filter substrate 92 are arranged so as to be orthogonal to the data lines 32 of the element substrate 91 and to overlap a plurality of pixel electrodes 10 linearly extending in the X direction in plan view. The overlapping region of the scanning electrode 8 and the pixel electrode 10 serves as one sub-pixel region SG.

Further, the wiring lines 31 of the element substrate 91 alternately overlap the scanning electrodes 8 of the color filter substrate 92 on the right and left sides (not shown) of the substrates, and the wiring lines 31 and the scanning lines 8 are electrically connected to each other by the conductive members 7 dispersed in the sealing member 3. That is, electrical connection between the wiring lines 31 of the element substrate 91 and the scanning electrodes 8 of the color filter substrate 92 is alternately made on the right and left sides of the substrates. In this way, the scanning electrodes 8 of the color filter substrate 92 are electrically connected to the driver IC 33 through the wiring lines 31 of the element substrate 91.

Structure of External Connection Wiring Lines

The outline of the invention will be described before the structure of the external connection wiring lines 35, which are characteristic parts of the invention, is described.

In general, when data is transmitted by the differential transmission scheme, in order to prevent the waveform of a differential signal from being distorted, a terminating resistor is provided between two signal lines to which the differential signal is input. As described above, in the liquid crystal display device 100 according to the first embodiment of the invention, a high-speed differential signal having low amplitude is input from the FPC 40 to the receiver 33a of the driver IC 33 through the pair of external connection wiring lines 35a and 35b by the differential transmission scheme. Therefore, in this structure, it is also necessary to provide a terminating resistor between the external connection wiring lines 35a and 35b.

In this case, the terminating resistor can be provided by any of the following methods: a method of patterning a conductive material between a pair of external connection wiring lines positioned in a driving IC; and a method of providing a chip-type resistor (terminating resistor), which is an electronic part, between a pair of external connection wiring lines positioned on a FPC. However, the former method has a problem in that a large variation in the resistance value of the terminating resistor occurs due to manufacturing errors. In addition, the latter method has a problem in that the chip-type resistor does not function as a terminating resistor by the large resistance of the pair of external connection wiring lines due to a long distance between the receiver and the chip-type resistor (terminating resistor). Also, these methods make it difficult to minutely adjust the resistance value of the terminating resistor, which causes a problem in that it is difficult to output a suitable differential signal from the FPC 40 to the receiver 33a of the driver IC 33 through the pair of external connection wiring lines 35a and 35b.

In order to solve these problems, in this embodiment of the invention, any one of an elemental metal, a metal compound, and two or more kinds of conductive materials having different sheet resistance values is used to manufacture the pair of external connection wiring lines 35a and 35b, and a terminating resistor is formed between the pair of external connection wiring lines 35a and 35b on the lower substrate 1 made of an insulating material, such as glass, using parts of the pair of external connection wiring lines 35a and 35b. Further, in this embodiment, in order for the driver IC 33 not to be effected by the resistance of the pair of external connection wiring lines 35a and 35b, when the driver IC 33 is provided in the projecting region 36 of the lower substrate with the ACF interposed therebetween, the terminating resistor is provided in the vicinity of the driving IC 33 so as not to contact the ACF protruding from the periphery of the driver IC 33 to the outside.

It is necessary to manufacture a high-accuracy terminating resistor in order for the receiver 33a of the driver IC 33 to properly receive the differential signals output from the FPC 40 through the pair of external connection wiring lines 35a and 35b. Therefore, in this embodiment, in order to achieve the object, the resistance value of the terminating resistor can be minutely adjusted so as to increase, when the quality of the liquid crystal display device 100 is tested.

Further, in this embodiment, a high-accuracy terminating resistor can be obtained by the following methods: a method of providing a plurality of wiring patterns having different line widths at a position where the terminating resistor will be formed, and of trimming the wiring patterns; a method of providing a wiring pattern whose line length can freely vary by means of trimming at a position where a terminating resistor will be formed and of trimming the wiring pattern; and a method of providing a combination of the above-mentioned wiring patterns at a position where a terminating resistor will be formed, and of trimming the combination of wiring patterns.

Among the three methods given as examples of the method of forming a high-accuracy terminating resistor, the method of providing a plurality of wiring patterns having different line widths at a position where a terminating resistor will be formed, and of trimming the wiring patterns is described in the first embodiment, and the method of providing a wiring pattern whose line length can freely vary by trimming at a position where a terminating resistor will be formed and of trimming the wiring pattern will be described in a second embodiment. In addition, the method of providing a combination of the above-mentioned wiring patterns at a position where a terminating resistor will be formed and of trimming the combination of wiring patterns will be described in a third embodiment.

First, a description will be made of the method according to the first embodiment of providing a plurality of wiring patterns having different line widths at a position where a terminating resistor will be formed and of trimming the wiring patterns to form a high-accuracy terminating resistor. In the following description, the same components as described above have the same reference numerals, and thus a description thereof will be omitted for the purposed of simplicity.

FIG. 5A is an enlarged partial plan view illustrating the vicinity (a region E1 represented by a dashed line) of the driving IC 33 shown in FIGS. 1 and 3 according to the first embodiment. FIG. 5B is a partial cross-sectional view taken along the line VB-VB of FIG. 5A. FIG. 5C is an equivalent circuit diagram of the driving IC 33 and a terminating resistor 50 formed by trimming which corresponds to FIG. 5A.

The pair of external connection wiring lines 35a and 35b are formed in a region of the lower substrate 1 corresponding to the projecting region 36. The driver IC 33 is mounted on the region of the lower substrate 1 corresponding to the projecting region 36, with an ACF 80 interposed therebetween, on one end side of each of the external connection wiring lines 35a and 35b. The one end of each of the external connection wiring lines 35a and 35b is electrically connected to the receiver 33a provided on the input side of the driver IC 33 through the ACF 80. Meanwhile, the other ends of the external connection wiring lines 35a and 35b are electrically connected to output wiring lines of the FPC 40 through an ACF (not shown).

The external connection wiring lines 35a and 35b have a two-layer structure of a first conductive layer 21 formed of an elemental metal, such as Cr or Al, or a metal compound, such as AlMo, and a second conductive layer 20 which is formed on the first conductive layer 21 and is made of a transparent conductive material, such as ITO or IZO.

Of the pair of external connection wiring lines 35a and 35b, the external connection wiring line 35a includes the first conductive layer 21 which linearly extends in the Y direction, a second conductive layer 20b which is formed on the first conductive layer 21 in a straight-line shape, and a second conductive layer 20a which is formed in a substantially rectangular shape so as to extend from one end of the second conductive layer 20b to the external connection wiring line 35b. The second conductive layer 20a is integrally formed with the second conductive layer 20b. The second conductive layer 20a, which is a component of the external connection wiring line 35a, is formed to have a smaller area than those of a first portion 21a and a second portion 21b, which are components of the external connection wiring line 35b, which will be described below. In the following description, the second conductive layer 20a is referred to as a 'third resistor 20a'.

The external connection wiring line 35b has the first conductive layer 21 including the first portion 21a, the second portion 21b, and a main line portion 21c and the second conductive layer 20 formed on the main line portion 21c.

The main line portion 21c has a straight-line shape and extends in the Y direction. The first portion 21a and the second portion 21b are wiring lines which are formed in straight-line shapes so as to be curved from the main line portion 21c to the external connection wiring line 35a substantially at a right angle. The first portion 21a and the second portion 21b are formed in the Y direction at a predetermined interval. The lengths of the first portion 21a and the second portion 21b in the X direction are equal to each other. End portions of the first portion 21a and the second portion 21b are covered with the second conductive layer 20a of the external connection wiring line 35a. Therefore, the second conductive layer 20a is electrically connected to the first portion 21a and the second portion 21b. A line width d2 of the second portion 21b is set to be larger than a line width d1 of the first portion 21a. A desired relationship may be established between the line width d1 and the line width d2. The area of the first portion 21a is smaller than that of the second portion 21b. In this embodiment, when the resistance value of the first portion 21a is R11 and the resistance value of the second portion 21b is R12, the resistance value R11 is set to be larger than the resistance value R12. In the following description, the first portion 21a is referred to as a 'first resistor 21a', and the second portion 21b is referred to as a 'second resistor 21b'. A resistor composed of the first resistor 21a, the second resistor 21b, and the third resistor 20a is referred to as a 'wiring pattern 85'.

As described above, when the driver IC 33 cannot receive suitable differential signals Sig1 and Sig2 from the FPC 40 through the pair of external connection wiring lines 35a and 35b due to a small resistance value of the wiring pattern 85 at the time of a quality test during a manufacturing process, it is necessary to increase the resistance value of the wiring pattern 85. However, in the first embodiment having the above-mentioned structure, it is possible to easily manufacture a high-accuracy terminating resistor 50 capable of solving the problem by cutting (trimming) one of the first resistor 21a and the second resistor 21b.

In the terminating resistor 50 manufactured in this way, the third resistor 20a (having a resistance value R1) is connected in series to one of the first resistor 20a (having the resistance value R11) and the second resistor 21b (having the resistance value R12). That is, the resistance value of the terminating resistor 50 is equal to a resistance value $R1+R1x$. The subscript x has a value of 1 or 2. FIG. 5A shows both the first resistor 21a and the second resistor 21b. However, practically, the first resistor 21a or the second resistor 21b is cut in the terminating resistor 50 shown in FIG. 5A. When it is not required to vary the resistance value of the terminating resistor 50, trimming does not need to be performed on the wiring pattern 85. In this case, in the terminating resistor 50, the third resistor 20a (having the resistance value R1) is connected in series to a parallel connection of the first resistor 21a (having the resistance value R11) and the second resistor 21b (having the resistance value R12).

In this way, in the first embodiment, when the liquid crystal is driven, the differential signals Sig1 and Sig2 are output from the FPC 40 to the receiver 33a through the pair of external connection wiring lines 35a and 35b. That is, in the first embodiment, the signal Sig1 corresponding to a positive potential (or a negative potential) is output from the FPC 40 to the receiver 33a through the external connection wiring line 35a, and the signal Sig2 corresponding to a negative potential (or a positive potential) is output from the FPC 40 to the receiver 33a through the external connection wiring line 35b.

Next, another structure according to the first embodiment of the invention will be described below.

FIG. 6A is an enlarged partial plan view illustrating the vicinity (a region E1 represented by a dashed line) of the driving IC 33 shown in FIGS. 1 and 3 according to another structure of the first embodiment. FIG. 6B is an equivalent circuit diagram of the driving IC 33 and a terminating resistor 51 manufactured by trimming which corresponds to FIG. 6A.

The first embodiment differs from another structure of the first embodiment in that the former is provided with two resistors having different line widths, which will be trimmed later, but the latter is provided with sixth resistors having different line widths, which will be trimmed later. That is, in another structure of the first embodiment, the number of resistors to be trimmed is larger than that of the resistors in the first embodiment.

More specifically, in another structure of the first embodiment, of a pair of external connection wiring lines 35a and 35b, the external connection wiring line 35a includes a first conductive layer 21 which linearly extends in the Y direction, a second conductive layer 20b which is formed on the first conductive layer 21 in a straight-line shape, and a second conductive layer 20c which is formed in a substantially rectangular shape so as to extend from one end of the second conductive layer 20b to the external connection wiring line 35b. In the following description, the second conductive layer 20c is referred to as a 'seventh resistor 20c' for the purposed of simplicity.

The external connection wiring line 35b has a first conductive layer 21 including a main line portion 21c, a first portion 21d, a second portion 21e, a third portion 21f, a fourth portion 21g, a fifth portion 21h, and a sixth portion 21i and the second conductive layer 20 formed on the main line portion 21c.

The first portion 21d, the second portion 21e, the third portion 21f, the fourth portion 21g, the fifth portion 21h, and the sixth portion 21i are formed in straight-line shapes so as to be curved from the main line portion 21c to the external connection wiring line 35a substantially at a right angle. In the following description, for the purpose of simplicity, the first portion 21d, the second portion 21e, the third portion 21f, the fourth portion 21g, the fifth portion 21h, and the sixth portion 21i are referred to as a 'first resistor 21d', a 'second resistor 21e', a 'third resistor 21f', a 'fourth resistor 21g', a 'fifth resistor 21h', and a 'sixth resistor 21i', respectively. A resistor composed of the first resistor 21d, the second resistor 21e, the third resistor 21f, the fourth resistor 21g, the fifth resistor 21h, the sixth resistor 21i, and the seventh resistor 20c is referred to as a 'wiring pattern 86'.

The first resistor 21d, the second resistor 21e, the third resistor 21f, the fourth resistor 21g, the fifth resistor 21h, and the sixth resistor 21i have the same length (in the X direction) and are arranged at predetermined intervals in the Y direction. A line width d3 of the first resistor 21d is set to be smaller than a line width d4 of the second resistor 21e. The line width d4 of the second resistor 21e is set to be smaller than a line width d5 of the third resistor 21f. The line width d5 of the third resistor 21f is set to be smaller than a line width d6 of the fourth resistor 21g. The line width d6 of the fourth resistor 21g is set to be smaller than a line width d7 of the fifth resistor 21h. The line width d7 of the fifth resistor 21h is set to be smaller than a line width d8 of the sixth resistor 21i. In addition, a desired relationship may be established among the line width d3, the line width d4, the line width d5, the line width d6, the line width d7, and the line width d8.

Therefore, in another structure of the first embodiment, the following relationship is satisfied among the areas of the resistors: the first resistor 21d<the second resistor 21e<the third resistor 21f<the fourth resistor 21g<the fifth resistor 21h<and the sixth resistor 21i. Thus, in another structure of the first embodiment, when the resistance value of the first resistor 21d is R21, the resistance value of the second resistor 21e is R22, the resistance value of the third resistor 21f is R23, the resistance value of the fourth resistor 21g is R24, the resistance value of the fifth resistor 21h is R25, and the resistance value of the sixth resistor 21i is R26, the following relationship is satisfied among the resistance values of the resistors: the resistance value R21>the resistance value R22>the resistance value R23>the resistance value R24>the resistance value R25>the resistance value R26.

When the driver IC 33 cannot receive the differential signals Sig1 and Sig2 from the FPC 40 through the pair of external connection wiring lines 35a and 35b due to a small resistance value of the wiring pattern 86 at the time of a quality test during a manufacturing process, it is necessary to increase the resistance value of the wiring pattern 86. In another structure of the first embodiment having the above-mentioned structure, it is possible to easily manufacture a high-accuracy terminating resistor 51 capable of solving the problem by cutting (trimming) all the resistors except any one of the first resistor 21d, the second resistor 21e, the third resistor 21f, the fourth resistor 21g, the fifth resistor 21h, and the sixth resistor 21i.

In the terminating resistor 51 manufactured in this way, the seventh resistor 20c (having a resistance value R2) is connected in series to any one of the first resistor 21d, the second resistor 21e, the third resistor 21f, the fourth resistor 21g, the fifth resistor 21h, and the sixth resistor 21i. That is, the resistance value of the terminating resistor 51 is equal to a resistance value R2+R2x. The subscript x has a value of 1 to 6.

FIG. 6A shows all the first resistor 21d, the second resistor 21e, the third resistor 21f, the fourth resistor 21g, the fifth resistor 21h, and the sixth resistor 21i. However, practically, all the resistors except any one of the first resistor 21d, the second resistor 21e, the third resistor 21f, the fourth resistor 21g, the fifth resistor 21h, and the sixth resistor 21i are cut in the terminating resistor 51 shown in FIG. 6A. When it is not required to vary the resistance value of the terminating resistor 51, trimming does not need to be performed on the wiring pattern 86. In another structure of the first embodiment, in order to manufacture the high-accuracy terminating resistor 51 capable of solving the above-mentioned problem, at least one of the first resistor 21d, the second resistor 21e, the third resistor 21f, the fourth resistor 21g, the fifth resistor 21h, and the sixth resistor 21i may be cut (trimmed).

In this way, in another structure of the first embodiment, when the liquid crystal is driven, the differential signals Sig1 and Sig2 are output from the FPC 40 to the receiver 33a through the pair of external connection wiring lines 35a and 35b.

Next, the effects of the first embodiment of the invention will be described below.

In the first embodiment, two or more kinds of conductive materials having different sheet resistance values (a combination of an elemental metal, such as Cr or Al, or a metal compound, such as AlMo and a transparent conductive material, such as ITO or IZO) are used to manufacture the pair of external connection wiring lines 35a and 35b, and a terminating resistor is formed between the pair of external connection wiring lines 35a and 35b on the lower substrate 1 made of an insulating material, such as glass, using parts of the pair of external connection wiring lines 35a and 35b.

In this way, when the differential signals Sig1 and Sig2 are output to the driver IC 33 through the pair of external connection wiring lines 35a and 35b by the differential transmission scheme, it is possible to make the terminating resistor 50 or 51 function as a terminating resistor. The terminating resistor 50 or 51 is formed on the lower substrate 1 made of an insulating material, which makes it possible to easily performing trimming on the terminating resistor 50 or 51 when it is necessary to increase the resistance value of the terminating resistor 50 or 51 at the time when the quality of the liquid crystal display device 100 is tested. In addition, the terminating resistor 50 or 51 is formed of the same material as that used for the pair of external connection wiring lines 35a and 35b which are made of two or more kinds of conductive materials having different sheet resistance values. Further, the pair of external connection wiring lines 35a and 35b are integrally formed with the terminating resistor 50 or 51. Therefore, an independent process of manufacturing the terminating resistor 50 or 51 is not needed when the liquid crystal display device 100 is manufactured, which makes it possible to reduce the number of manufacturing processes. However, when trimming should be performed to manufacture the high-accuracy terminating resistor 50 or 51, it goes without saying that the number of manufacturing processes will increase by a number corresponding to the trimming process.

Further, in the first embodiment, the third resistor 20a (or the seventh resistor 20c) is manufactured so as to occupy half or more of the area of the terminating resistor 50 (or 51) formed of a transparent conductive material having a large sheet resistance value, such as ITO or IZO, and a plurality of resistors, which will be trimmed later, having different line widths (which correspond to the first resistor 21a and the second resistor 21b in the first embodiment, and corresponds to the first resistor 21d, the second resistor 21e, the third resistor 21f, the fourth resistor 21g, the fifth resistor 21h, and the sixth resistor 21i in another structure of the first embodiment. Hereinafter, the plurality of resistors are simply referred to as resistors) is manufactured. In this case, generally, the sheet resistance value of ITO is about 50Ω±30%/sq, and the sheet resistance value of IZO is about 37 Ω/sq. In addition, the sheet resistance value of Cr is about 1.3 Ω±0.4%/sq, the sheet resistance value of Al is about 0.24 Ω/sq, and the sheet resistance value of AlMo is about 0.36 Ω/sq.

In the first embodiment, the third resistor 20a (or the seventh resistor 20c) is manufactured so as to occupy half or more of the area of the terminating resistor 50 (or 51) formed of a transparent conductive material having a large sheet resistance value, such as ITO or IZO, which makes it possible to roughly set the overall resistance of the terminating resistor 50 or 51.

Further, in the first embodiment, a plurality of resistors having different line widths, which will be trimmed, are formed of Cr, Al, or AlMo having a small sheet resistance value. In the first embodiment, when the resistance value of the wiring pattern 85 or 86 needs to increase in order to output the differential signals Sig1 and Sig2 from the FPC 40 to the receiver 33a of the driver IC 33 through the pair of external connection wiring lines 35a and 35b at the time of a quality test during the manufacturing process, it is possible to easily manufacture the high-accuracy terminating resistor 50 or 51 by cutting (trimming) any one of the plurality of resistors having different line widths or by cutting (trimming) at least one of the plurality of resistors having different line widths. In this case, it is also possible to minutely adjust (match) the resistance value of the terminating resistor 50 or 51 by radiating a laser beam onto some of the resistors remaining uncut to remove (trim) them. In this way, when the liquid crystal is driven, it is possible to output the differential signals Sig1 and Sig2 from the FPC 40 to the receiver 33a of the driver IC 33 through the pair of external connection wiring lines 35a and 35b.

In the first embodiment of the invention, the terminating resistor 50 or 51 is provided in the vicinity of the driver IC 33. In this way, the driver IC 33 is not affected by the resistance of the pair of external connection wiring lines 35a and 35b, and thus it is possible to output suitable differential signals Sig1 and Sig2 from the FPC 40 to the receiver 33a of the driver IC 33.

Further, in the first embodiment of the invention, the terminating resistor 50 or 51 is provided so as not to contact the ACF 80 protruding from the periphery of the driver IC 33 to the outside. In this way, in a case in which the driver IC 33 is mounted on the lower substrate 1 with the ACF 80 interposed therebetween, even when the ACF 80 protrudes from the periphery of the driving IC 33, it is possible to prevent the terminating resistor 50 from being electrically connected to the ACF 80 at the time when the liquid crystal display device 100 is driven.

In the first embodiment, the terminating resistor 50 or 51 is formed of two or more conductive materials having different sheet resistance values, but the invention is not limited thereto. For example, in the invention, the terminating resistor 50 or 51 may be formed of an elemental metal, such as Cr or Al, or a metal compound, such as AlMo.

Second Embodiment

Next, a method of manufacturing a high-accuracy terminating resistor according to a second embodiment of the invention will be described below with reference to FIGS. 7A to 9G More specifically, a description will be made below of a method of providing a wiring pattern whose length can freely vary by trimming at a position where a terminating resistor will be formed, and of trimming the wiring pattern to manufacture a terminating resistor. The second embodiment differs from the first embodiment in the structure of a pair of external connection wiring lines 35a and 35b. Therefore, in the second embodiment, the same components as those in the first embodiment have the same reference numerals, and thus a description thereof will be omitted for the purpose of simplicity.

FIG. 7A is an enlarged partial plan view illustrating the vicinity (a region E1 represented by a dashed line) of the driving IC 33 shown in FIGS. 1 and 3 according to the second embodiment. FIGS. 7B to 7D are enlarged views illustrating only a wiring pattern 21k of FIG. 7A and show trimming parts of the wiring pattern 21k. FIG. 7E is an equivalent circuit diagram of the driving IC 33 and a terminating resistor 52 manufactured by trimming which corresponds to FIG. 7A.

Of a pair of external connection wiring lines 35a and 35b, the external connection wiring line 35a includes a second conductive layer 20d that has a substantially rectangular shape and extends toward the external connection wiring line 35b. The second conductive layer 20d is provided in the vicinity of the driver IC 33 so as not to contact an ACF protruding from the periphery of the driving IC 33 to the outside. The second conductive layer 20d is set to have a resistance value R3. In the following description, the second conductive layer 20d is referred to as a 'fourth resistor 20d', for the purpose of simplicity.

The external connection wiring line 35b has a first conductive layer 21 including a first portion 21ka, a second portion 21kb, a third portion 21kc, and a main line portion 21c and the second conductive layer 20 formed on the main line portion 21c. In the following description, for the purpose of simplicity, a resistor composed of the first portion 21ka, the second portion 21kb, and the third portion 21kc is referred to as a 'wiring pattern 21k', and a resistor composed of the wiring pattern 21k and a fourth resistor 20d is referred to as a 'wiring pattern 87'.

The wiring pattern 87 is provided in the vicinity of the driver IC 33 so as not to contact an ACF protruding from the periphery of the driver IC 33 to the outside. The first portion 21ka and the second portion 21kb are wiring lines each having a U shape. The third portion 21kc is a straight wiring line that is curved from the main line portion 21c to the external connection wiring line 35a substantially at a right angle. The fourth resistor 20d, which is a component of the external connection wiring line 35a, covers the vicinity of an end portion of the third portion 21kc, so that the third portion 21kc and the fourth resistor 20d are electrically connected to each other. The first portion 21ka and the second portion 21kb are connected to the third portion 21kc, with their opening sides closed by the first portion 21kc. In addition, the first portion 21ka is arranged above the third portion 21kc, and the second portion 21kb is arranged below the third portion 21kc. The first portion 21ka and the second portion 21kb are not symmetric with respect to the third portion 21kc. The first portion 21ka, the second portion 21kb, and the third portion 21kc are set to have the same line width.

In the second embodiment having the above-mentioned structure, when the liquid crystal is driven, differential signals Sig1 and Sig2 are output from an FPC 40 to a receiver 33a through the pair of external connection wiring lines 35a and 35b.

Next, the effects of the second embodiment of the invention will be described below.

In the second embodiment, the wiring pattern 21k to be trimmed when a quality test is performed during the manufacturing process is formed in the above-mentioned shape. Therefore, in the second embodiment, as shown in FIGS. 7B to 7D, it is possible to form three kinds of resistors having different line lengths, that is, a first resistor 21kd, a second resistor 21ke, and a third resistor 21kf, by cutting portions of the wiring pattern 21k represented by a symbol 'x' using, for example, a laser.

In this embodiment, when a boundary point between the third portion 21kc and the fourth resistor 20d is P1 and a boundary point between the third portion 21kc and the main line portion 21c is P2, the length of the first resistor 21kd having a path K1 from the point P1 to the point P2 is L1, the length of the second resistor 21ke having a path K2 from the point P1 to the point P2 is L2 (<L1), and the length of the third resistor 21kf having a path K3 from the point P1 to the point P2 is L3 (<L2). Therefore, when the resistance value of the first resistor 21kd is R31, the resistance value of the second resistor 21ke is R32 (<R31), and the resistance value of the third resistor 21kf is R33 (<R32). In this case, it is possible to minutely adjust (match) the resistance of the terminating resistor 52 by removing some of the resistors remaining uncut by using, for example, a laser. In addition, when it is not required to vary the resistance value of the terminating resistor 52, trimming does not need to be performed on the wiring pattern 21.

Therefore, in the second embodiment, it is possible to easily manufacture the high-accuracy terminating resistor 52 by correspondingly cutting (trimming) parts of the first portion 21ka, the second portion 21kb and the third portion 21kc, when the resistance value of the wiring pattern 87 needs to increase in order to output the differential signals Sig1 and Sig2 from the FPC 40 to the receiver 33a of the driver IC 33 through the pair of external connection wiring lines 35a and 35b at the time of a quality test during the manufacturing process.

In the terminating resistor 52 manufactured in this way, the fourth resistor 20d (having the resistance value R3) is connected in series to any one of the first resistor 21kd, the second resistor 21ke, and the third resistor 21kf. That is, in this case, the resistance value of the terminating resistor 52 is equal to a resistance value R3+R3x. The subscript x has a value of 1 to 3.

In this way, when the liquid crystal is driven, it is possible to output the differential signals Sig1 and Sig2 from the FPC 40 to the receiver 33a of the driver IC 33 through the pair of external connection wiring lines 35a and 35b. In addition, in the second embodiment, effects other than the above-mentioned effects are the same as those in the first embodiment, and thus a description thereof will be omitted.

Next, another structure according to the second embodiment of the invention will be described below with reference to FIGS. 8A and 8B and FIGS. 9A to 9G. In the following description, the same components as described above have the same reference numerals, and a detailed description thereof will be omitted.

FIG. 8A is an enlarged partial plan view illustrating the vicinity (a region E1 represented by a dashed line) of the driving IC 33 shown in FIGS. 1 and 3 according to another structure of the second embodiment of the invention. FIG. 8B is an equivalent circuit diagram of the driving IC 33 and a terminating resistor 53 manufactured by trimming which corresponds to FIG. 8A. FIGS. 9A to 9G are enlarged views illustrating only a wiring pattern 21L of FIG. 8A and show parts of the wiring pattern 21L to be trimmed.

Of a pair of external connection wiring lines 35a and 35b, the external connection wiring line 35a includes a second conductive layer 20e that has a substantially rectangular shape and extends toward the external connection wiring line 35b. The second conductive layer 20e is provided in the vicinity of the driver IC 33 so as not to contact an ACF protruding from the periphery of the driving IC 33 to the outside. The second conductive layer 20e is set to have a resistance value R4. In the following description, the second conductive layer 20e is referred to as an 'eighth resistor 20e', for the purpose of simplicity.

The external connecting wiring line 35b includes a first conductive layer 21 having a main line portion 21c having a straight-line shape, a first portion 21La, a second portion 21Lb, a third portion 21Lc, a fourth portion 21Ld, a fifth portion 21Le, a sixth portion 21Lf, a seventh portion 21Lg, a ninth portion 21Lk, and an eighth portion 21Lh that has a plurality of openings 21Li and is formed in a rectangular shape, and the second conductive layer 20 formed on the main line portion 21c. These components are integrally formed. In the following description, for the purpose of simplicity, a resistor composed of the first portion 21La, the second portion 21Lb, the third portion 21Lc, the fourth portion 21Ld, the fifth portion 21Le, the sixth portion 21Lf, the seventh portion 21Lg, the eighth portion 21Lh having the openings 21Li therein, and the ninth portion 21Lk is referred to as a 'wiring pattern 21L'. In addition, a resistor composed of the wiring pattern 21L and the eighth resistor 20e is referred to as a 'wiring pattern 88'.

The wiring pattern 88 is provided in the vicinity of the driver IC 33 so as not to contact an ACF protruding from the periphery of the driver IC 33 to the outside. The first portion 21La, the second portion 21Lb, the third portion 21Lc, the fourth portion 21Ld, the fifth portion 21Le, the sixth portion 21Lf, and the seventh portion 21Lg are formed so as to be curved from the main line portion 21c to the external connection wiring line 35a at a right angle. An end of the ninth portion 21Lk is covered with the eighth resistor 20e, which is a component of the external connection wiring line 35a, so that the ninth portion 21Lk and the eighth resistor 20e are electrically connected to each other. The first portion 21La, the second portion 21Lb, the third portion 21Lc, the fourth portion 21Ld, the fifth portion 21Le, the sixth portion 21Lf, the seventh portion 21Lg, and the ninth portion 21Lk have the same line width. The eighth portion 21Lh having the plurality of openings 21Li is arranged between the ninth portion 21Lk and the first to seventh portions 21La to 21Lg.

In another structure of the second embodiment having the above-mentioned structure, when the liquid crystal is driven, the differential signals Sig1 and Sig2 are output from the FPC 40 to the receiver 33a through the pair of external connection wiring lines 35a and 35b.

Next, the effects of another structure of the second embodiment of the invention will be described below.

In another structure of the second embodiment, the wiring pattern 21L to be trimmed when a quality test is performed during the manufacturing process is formed in the above-mentioned shape. Therefore, in another structure of the second embodiment, as shown in FIGS. 9A to 9Q it is possible to form seven types of resistors having different line widths and paths, that is, a first resistor 21Lp, a second resistor 21Lq, a third resistor 21Lr, a fourth resistor 21Ls, a fifth resistor 21Lt, a sixth resistor 21Lu, and a seventh resistor 21Lv, by cutting parts of the wiring pattern 21L represented by a symbol 'x' using, for example, a laser.

In this embodiment, when a boundary point between the ninth portion 21Lk and the eighth resistor 20e is P1, a boundary point between the first portion 21La and the main line portion 21c is P2, a boundary point between the second portion 21Lb and the main line portion 21c is P3, a boundary point between the third portion 21Lc and the main line portion 21c is P4, a boundary point between the fourth portion 21Ld and the main line portion 21c is P5, a boundary point between the fifth portion 21Le and the main line portion 21c is P6, a boundary point between the sixth portion 21Lf and the main line portion 21c is P7, and a boundary point between the seventh portion 21Lg and the main line portion 21c is P8, the length of the first resistor 21Lp having a path from the point P1 to the point P2 is L10, the length of the second resistor 21Lq having a path from the point P1 to the point P3 is L11 (<L10), the length of the third resistor 21Lr having a path from the point P1 to the point P4 is L12 (<L11), the length of the fourth resistor 21Ls having a path from the point P1 to the point P5 is L13 (<L12), the length of the fifth resistor 21Lt having a path from the point P1 to the point P6 is L14 (<L13), the length of the sixth resistor 21Lu having a path from the point P1 to the point P7 is L15 (<L14), and the length of the seventh resistor 21Lv having a path from the point P1 to the point P8 is L16 (<L15).

Therefore, when the resistance value of the first resistor 21Lp is R41, the resistance value of the second resistor 21Lq is R42 (<R41), the resistance value of the third resistor 21Lr is R43 (<R42), the resistance value of the fourth resistor 21Ls is R44 (<R43), the resistance value of the fifth resistor 21Lt is R45 (<R44), the resistance value of the sixth resistor 21Lu is R46 (<R45), and the resistance value of the seventh resistor 21Lv is R47 (<R46). In this case, it is possible to minutely adjust (match) the resistance of the terminating resistor 53 by removing some of the resistors remaining uncut using, for example, a laser. In addition, when it is not required to vary the resistance value of the terminating resistor 53, trimming does not need to be performed on the wiring pattern 88.

Therefore, in another structure of the second embodiment, it is possible to easily manufacture the high-accuracy terminating resistor 53 by cutting (trimming) proper parts of the first portion 21La, the second portion 21Lb, the third portion 21Lc, the fourth portion 21Ld, the fifth portion 21Le, the sixth portion 21Lf, the seventh portion 21Lg, and the eighth portion 21Lh, when the resistance value of the wiring pattern 88 needs to increase in order to output the differential signals Sig1 and Sig2 from the FPC 40 to the receiver 33a of the driver IC 33 through the pair of external connection wiring lines 35a and 35b at the time of a quality test in the manufacturing process.

In the terminating resistor 53 manufactured in this way, the eighth resistor 20e (having the resistance value R4) is connected in series to any one of the first resistor 21Lp, the second resistor 21Lq, the third resistor 21Lr, the fourth resistor 21Ls, the fifth resistor 21Lt, the sixth resistor 21Lu, and the seventh resistor 21Lv. That is, in this case, the resistance value of the terminating resistor 53 is equal to a resistance value R4+R4x. The subscript x has a value of 1 to 7.

In this way, when the liquid crystal is driven, the differential signals Sig1 and Sig2 can be output from the FPC 40 to the receiver 33a of the driver IC 33 through the pair of external connection wiring lines 35a and 35b.

Further, in another structure of the second embodiment, the pattern of the resistor manufactured by trimming is not limited to the above-mentioned patterns. That is, in another structure of the second embodiment, when the wiring pattern 21L is trimmed, parts other than the above-mentioned trimming parts may be cut, or the number of trimming parts may be changed to manufacture various patterns of resistors having different line widths and a plurality of paths. However, in this structure, since it is difficult to describe all the patterns of resistors on account of space considerations, a description thereof will be omitted.

As described above, another structure of the second embodiment can manufacture larger resistors having different line widths than the above-described second embodiment, which makes it possible to minutely and easily adjust the resistance value of the terminating resistor 53 better. In addition, in another structure of the second embodiment, effects other than the above-mentioned effects are the same as those in the first embodiment, and thus a description thereof will be omitted.

Third Embodiment

Next, a method of manufacturing a terminating resistor according to a third embodiment of the invention will be described below with reference to FIGS. 10A and 10B and FIGS. 11A to 11E. More specifically, a description will be made below of a method of providing a wiring pattern obtained by combining the conception of the first embodiment with the conception of the second embodiment at a position where a terminating resistor will be formed and of trimming the wiring pattern to manufacture a high-accuracy wiring pattern. The third embodiment differs from the first embodiment in the structure of a pair of external connection wiring lines 35a and 35b. Therefore, in the following description, the same components as those in the first embodiment have the same reference numerals, and thus a description thereof will be omitted for the purpose of simplicity.

FIG. 10A is an enlarged partial plan view illustrating the vicinity (a region E1 represented by a dashed line) of the driving IC 33 shown in FIGS. 1 and 3 according to the third embodiment. FIG. 10B is an equivalent circuit diagram of the driving IC 33 and a terminating resistor 54 manufactured by trimming which corresponds to FIG. 10A. FIGS. 11A to 11E are enlarged views illustrating only a wiring pattern 89 of FIG. 10A and show trimming parts of the wiring pattern 89.

Of the pair of external connection wiring lines 35a and 35b, the external connection wiring line 35a includes a first conductive layer 21 that has a straight-line shape and extends in the Y direction and a second conductive layer 20 formed on the first conductive layer 21 so as to cover the first conductive layer 21.

The external connecting wiring line 35b includes a first conductive layer 21 having a main line portion 21c, a first portion 21ma (a portion represented by a dashed line), a second portion 21mb (a portion represented by a dashed line), a third portion 21mc (a portion represented by a dashed line), a fourth portion 21md (a portion represented by a dashed line), and a fifth portion 21me (a portion represented by a dashed line) and the second conductive layer 20 formed on the main line portion 21c. The main line portion 21c is connected to one end of each of the first portion 21ma, the second portion 21mb, the third portion 21mc, the fourth portion 21md, and the fifth portion 21me. In the following description, for the purpose of simplicity, a resistor composed of the first portion 21ma, the second portion 21mb, the third portion 21mc, the fourth portion 21md, and the fifth portion 21me is referred to as a 'wiring pattern 89'.

The wiring pattern 89 is a conductive layer to be trimmed, and is provided in the vicinity of the driver IC 33 so as not to contact an ACF protruding from the periphery of the driver IC 33 to the outside. The first portion 21ma, the second portion 21mb, the third portion 21mc, and the fourth portion 21md each have a U shape, and the fifth portion 21me extends in the X direction in a straight-line shape. An end of the fifth portion 21*me* is covered with the second conductive layer 20, which is a component of the external connection wiring line 35*a*, so that the fifth portion 21*me* and the second conductive layer 20 are electrically connected to each other.

When a line width of the first portion 21*ma* is d10, a line width of the second portion 21*mb* is d11, a line width of the third portion 21*mc* is d12, a line width of the fourth portion 21*md* is d13, and a line width of the fifth portion 21*me* is d14, the following relationship is satisfied among the line widths of the components: the line width d10 of the first portion 21*ma*>the line width d11 of the second portion 21*mb*>the line width d12 of the third portion 21*mc*>the line width d13 of the fourth portion 21*md*>the line width d14 of the fifth portion 21*me*.

In the third embodiment having the above-mentioned structure, when the liquid crystal is driven, the differential signals Sig1 and Sig2 are output from the FPC 40 to the receiver 33*a* through the pair of external connection wiring lines 35*a* and 35*b*.

Next, the effects of the third embodiment of the invention will be described below.

In the third embodiment, the wiring pattern 89 to be trimmed when a quality test is performed during the manufacturing process is formed in the above-mentioned shape. Therefore, in the third embodiment, as shown in FIGS. 11A to 11E, it is possible to form five types of resistors, that is, a first resistor 21*mp*, a second resistor 21*mq*, a third resistor 21*mr*, a fourth resistor 21*ms*, and a fifth resistor 21*mt*, by cutting portions of the wiring pattern 89 represented by a symbol 'x' using, for example, a laser.

In this embodiment, when a boundary point between the external connection wiring line 35*a* and the fifth portion 21*me* is P1, a boundary point between the first portion 21*ma* and the main line portion 21*c* is P2, a boundary point between the second portion 21*mb* and the main line portion 21*c* is P3, a boundary point between the third portion 21*mc* and the main line portion 21*c* is P4, a boundary point between the fourth portion 21*rmd* and the main line portion 21*c* is P5, and a boundary point between the fifth portion 21*me* and the main line portion 21*c* is P6, the length of the first resistor 21*mp* having a path from the point P1 to the point P2 is L20, the length of the second resistor 21*mq* having a path from the point P1 to the point P3 is L21 (<L20), the length of the third resistor 21*mr* having a path from the point P1 to the point P4 is L22 (<L21), the length of the fourth resistor 21*ms* having a path from the point P1 to the point P5 is L23 (<L22), and the length of the fifth resistor 21*mt* having a path from the point P1 to the point P6 is L24 (<L23).

Therefore, when the resistance value of the first resistor 21*mp* is R51, the resistance value of the second resistor 21*mq* is R52 (<R51), the resistance value of the third resistor 21*mr* is R53 (<R52), the resistance value of the fourth resistor 21*ms* is R54 (<R53), and the resistance value of the fifth resistor 21*mt* is R55 (<R54).

In the third embodiment, it is possible to easily manufacture the high-accuracy terminating resistor 54 by cutting (trimming) parts of the first portion 21*ma*, the second portion 21*mb*, the third portion 21*mc*, the fourth portion 21*md*, and the fifth portion 21 me shown in FIGS. 11A to 11E, when the resistance value of the wiring pattern 89 needs to increase in order to output the differential signals Sig1 and Sig2 from the FPC 40 to the receiver 33*a* of the driver IC 33 through the pair of external connection wiring lines 35*a* and 35*b* at the time of a quality test during the manufacturing process. Further, in this case, it is also possible to minutely adjust (match) the resistance value of the terminating resistor 54 by removing some of the resistors remaining uncut by using, for example, a laser. In addition, when it is not required to vary the resistance value of the terminating resistor 54, trimming does not need to be performed on the wiring pattern 89.

In this way, when the liquid crystal is driven, it is possible to output the differential signals Sig1 and Sig2 from the FPC 40 to the receiver 33*a* of the driver IC 33 through the pair of external connection wiring lines 35*a* and 35*b*. In addition, in the third embodiment, effects other than the above-mentioned effects are the same as those in the first embodiment, and thus a description thereof will be omitted.

In the third embodiment, the pattern of the resistor manufactured by trimming is not limited to the above-mentioned pattern. That is, in the third embodiment, when the wiring pattern 89 is trimmed, if necessary, parts other than the above-mentioned trimming parts may be cut, or the number of trimming parts may be changed to manufacture various patterns of resistors having different line widths and a plurality of paths. However, in this structure, since it is difficult to describe all the patterns of resistors on account of space considerations, a description thereof will be omitted.

Modifications

The wiring patterns for manufacturing the terminating resistors are given as examples in the first to third embodiments. However, the structures described in the first to third embodiments are just illustrative, but are not limitative. Various modifications and changes of the wiring pattern for manufacturing the terminating resistor can be made without departing from the scope and spirit of the invention.

In the above-described embodiments, a wiring pattern is provided between a pair of external connection wiring lines 35*a* and 35*b* and proper parts of the wiring pattern are cut to manufacture a high-accuracy terminating resistor, but the invention is not limited thereto. For example, a high-accuracy terminating resistor may be manufactured by a method of providing a wiring pattern between a pair of external connection wiring lines 35*a* and 35*b* and radiating a laser beam onto an end portion of the wiring pattern to remove it, without cutting parts of the wiring pattern.

In the above-described embodiments, the invention is applied to a transmissive liquid crystal display device, but the invention is not limited thereto. For example, the invention may be applied to a reflective or transmissive liquid crystal display device. In the above-described embodiments and modifications, the invention is applied to an active matrix liquid crystal display device using switching elements, such as TFD elements or TFT elements, but the invention is not limited thereto. For example, the invention may be applied to a so-called simple matrix liquid crystal display device.

Figure 12:
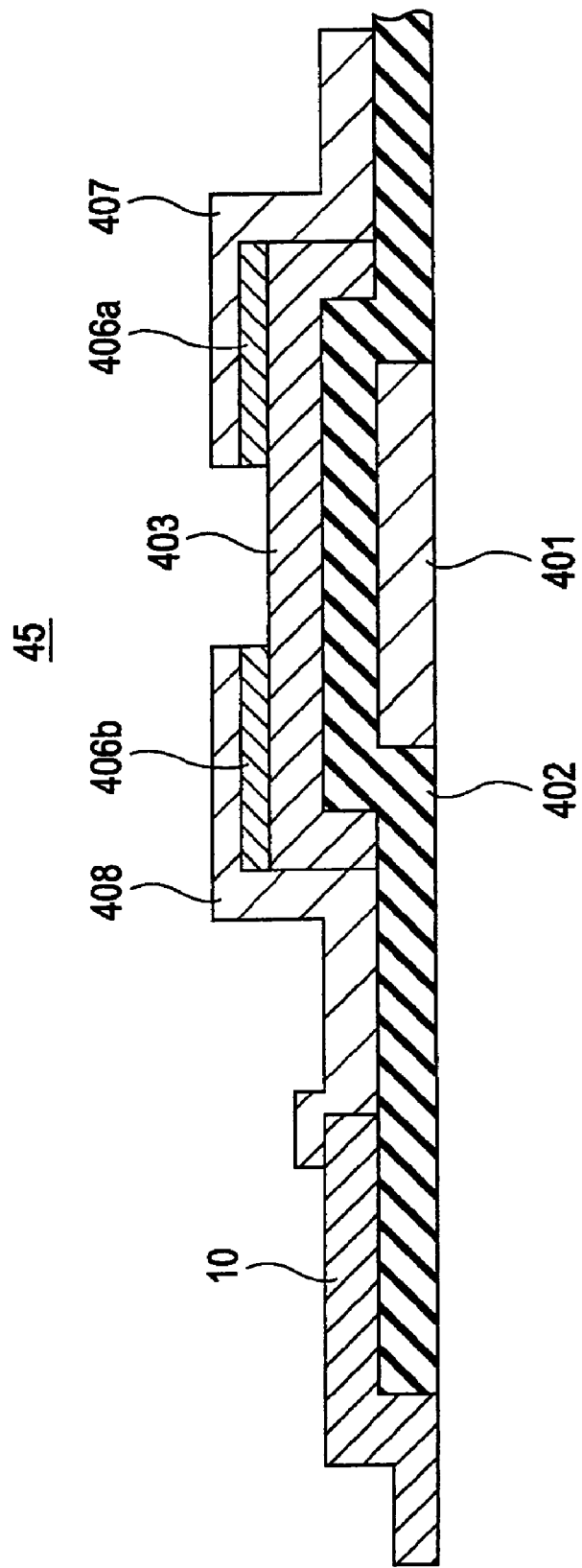
FIG. 12 is a cross-sectional view schematically illustrating the structure of a TFT element which can be applied to the invention.

Further, in the above-described embodiments, the TFD elements 27 are used as switching elements, but the invention is not limited thereto. For example, instead of the TFD elements 27, three-terminal elements, such as amorphous thin film transistors (TFTs), may be used as switching elements. FIG. 12 is a cross-sectional view illustrating the amorphous TFT element.

In FIG. 12, in a TFT element 45, a gate insulating film 402 is provided on a gate electrode 401 branched from a gate line (not shown) so as to cover the gate electrode 401. An a-Si layer 403 is provided on the gate insulating film 402 so as to overlap the gate electrode 401. Two $n^+$-a-Si layers 406*a* and 406*b* that are separated from each other are provided on the a-Si layer 403. A source electrode 407 branched from a source line (not shown) is provided on the $n^+$-a-Si layer 406*a*, and a drain electrode 408 is provided on the $n^+$-a-Si layer 406*b*. A portion of the drain 408 overlaps a portion of a pixel electrode 10, and the drain 408 and the pixel electrode 10 are electrically connected to each other. An element substrate having the amorphous TFT element formed thereon may have various well-known structures.

Method of Manufacturing Liquid Crystal Display Device

Next, a method of manufacturing a liquid crystal display device 100 according to the first to third embodiments of the invention will be described below with reference to FIGS. 13 to 16B. Since the first to third embodiments have substantially the same structure, a description will be made below, centering on a manufacturing method according to another structure of the first embodiment shown in FIGS. 5A to 5C, and a supplementary description will be made of a difference between another structure of the first embodiment and the other embodiments.

Figure 13:
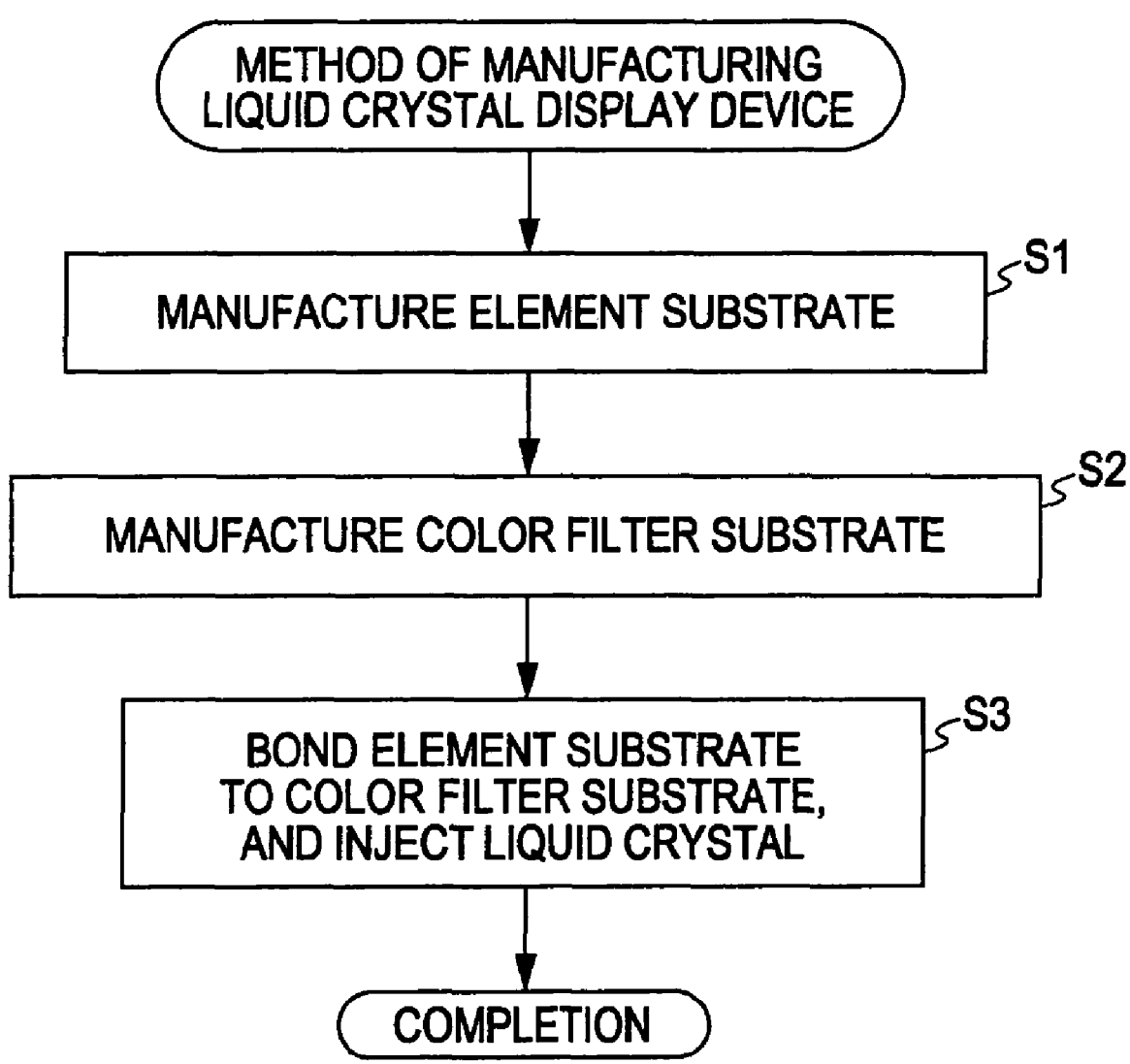
FIG. 13 is a flow chart illustrating a method of manufacturing a liquid crystal display device according to the invention.
Figure 14:
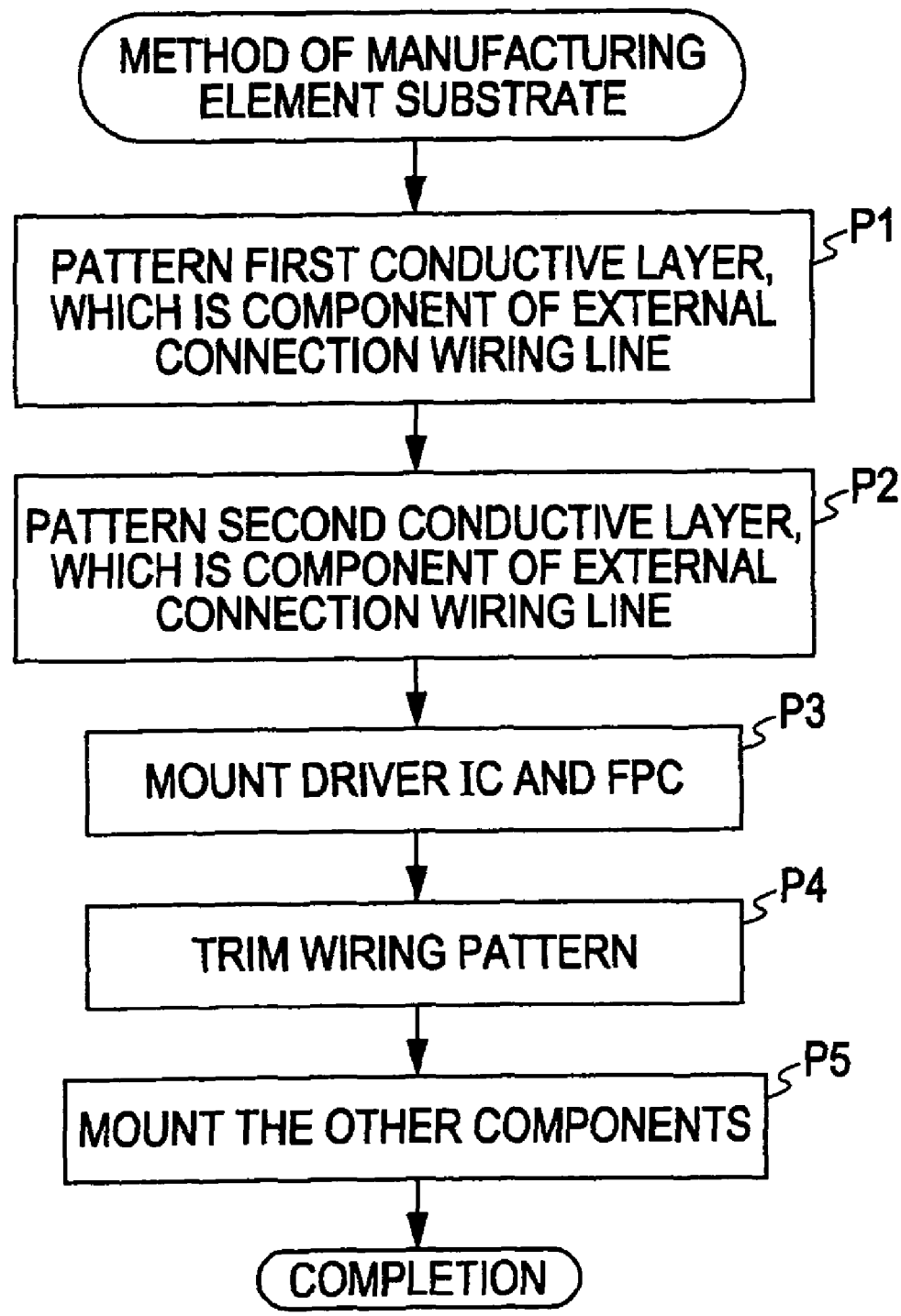
FIG. 14 is a flow chart illustrating a method of manufacturing an element substrate according to the invention.

FIG. 13 is a flow chart illustrating the manufacturing method according to another structure of the first embodiment of the invention. FIG. 14 is a flow chart illustrating a method of manufacturing an element substrate corresponding to step S1 shown in FIG. 13. FIGS. 15A and 15B and FIGS. 16A and 16B are process diagrams corresponding to processes P1 to P4 shown in FIG. 14. In FIGS. 15A and 15B and FIG. 16A, the driver IC 33 is provided in a region 33x surrounded by a two-dotted chain line.

First, an element substrate is manufactured (step S1). The element substrate is manufactured by processes P1 to P5. Patterning is performed on a first conductive layer, which is a component of the external connection wiring line 35 (process P1).

More specifically, as shown in FIG. 15A, a metal film made of, for example, an elemental metal, such as Cr or Al, or a metal compound, such as AlMo, is laminated with a predetermined thickness on the projecting region 36 of the lower substrate 1 formed of an insulating material, such as glass. Then, the metal film is patterned in a shape shown in FIG. 15A. In this way, the first conductive layer 21 having a straight-line shape is formed in a region 35ax where the external connection wiring line 35a will be formed. In addition, the first conductive layer 21 including the main line portion 21c, the first portion 21d, the second portion 21e, the third portion 21f, the fourth portion 21g, the fifth portion 21h, and the sixth portion 21i is formed in a region 35bx where the external connection wiring line 35b will be formed. The main line portion 21c is formed so as to extend in the Y direction. The first portion 21d, the second portion 21e, the third portion 21f the fourth portion 21g, the fifth portion 21h, and the sixth portion 21i are formed so as to be curved from the main line portion 21c to the region 35ax where the external connection wiring line 35a will be formed substantially at a right angle. In this case, the line width of the first portion 21d is set to d3, the line width of the second portion 21e is set to d4 (>d3), the line width of the third portion 21f is set to d5 (>d4), the line width of the fourth portion 21g is set to d6 (>d5), the line width of the fifth portion 21h is set to d7 (>d6), and the line width of the sixth portion 21i is set to d8 (>d7). A predetermined relationship is established among the line width d3, the line width d4, the line width d5, the line width d6, the line width d7, and the line width d8.

In process P1, for example, the data line 32, the wiring line 31, and the second metal layers 316 and 336 (the gate electrode 401 when the TFT element 45 is used), components of the TFD element 27, which are shown in FIG. 3 are simultaneously formed of the same material as that used for the first conductive layer 21, which is a component of the external connection wiring line 35 (the process is not shown).

When the TFT elements 45, not the TFD elements 27, are provided on the element substrate as the switching elements, the gate insulating film 402 (interlayer insulating film) is formed on, for example, the lower substrate 1 and the first conductive layer 21, which is a component of the external connection wiring line 35. In this case, in the next process P2, it is necessary to electrically, connect the second conductive layer 20, which is a component of the external connection wiring line 35, to the first portion 21d, the second portion 21e, the third portion 21f, the fourth portion 21g, the fifth portion 21h, and the sixth portion 21i. Therefore, it is necessary to provide a plurality of contact holes (openings) 21z at the end portions of these components by, for example, a photolithography technique, as shown in FIG. 15B.

Next, the second conductive layer 20, which is a component of the external connection wiring line 35, is patterned (process P2). More specifically, as shown in FIG. 16A, a conductive film formed of a transparent material, such as ITO or IZO, is laminated with a predetermined thickness on the lower substrate 1 and the first conductive layer 21, which is a component of the external connection wiring line 35 and is then patterned in a shape shown in FIG. 16A. In this way, the second conductive layer 20b having a straight-line shape is formed on the first conductive layer 21, which is a component of the external connection wiring line 35, and the second conductive layer 20c (the seventh resistor 20c) is formed in a substantially rectangular shape so as to extend from the second conductive layer 20b to the first conductive layer 21, which is a component of the external connection wiring line 35b, thereby forming the external connection wiring line 35a. In this case, a portion of the second conductive layer 20c is electrically connected to end portions of the first portion 21d, the second portion 21e, the third portion 21f, the fourth portion 21g, the fifth portion 21h, and the sixth portion 21i. In addition, the second conductive layer 20 having a straight-line shape is formed on the first conductive layer 21, which is a component of the external connection wiring line 35b, thereby forming the external connection wiring line 35b. It is preferable that the second conductive layer 20c (the seventh resistor 20c), which is a component of the external connection wiring line 35a, be formed to occupy half or more of the total area of the terminating resistor 86 that is finally formed.

In this way, the wiring pattern 86 formed of two or more conductive materials having different sheet resistance values is provided between a pair of external connection wiring lines 35a and 35b, at a position not contacting an ACF which protrudes from the periphery of the driver IC 33 to the outside, and in the vicinity of the driver IC 33 on the lower substrate 1.

Next, the driver IC 33 including the receiver 33a is mounted in a region 33x where the driver IC 33 will be provided, with the ACF 80 interposed therebetween, and the FPC 40 is connected to the end of the external connection wiring line 35 including the pair of external connection wiring lines 35a and 35 through an ACF (not shown) (process P3). In this way, one end of each of the pair of external connection wiring lines 35a and 35b is electrically connected to the receiver 33a of the driver IC 33, and the other ends of the pair of external connection wiring lines 35a and 35b are electrically connected to the FPC 40. Thus, it is possible to output the differential signals Sig1 and Sig2 from the FPC 40 to the receiver 33a of the driver IC 33 through the pair of external connection wiring lines 35a and 35b.

Subsequently, the wiring pattern is trimmed in order to test the quality of the element substrate (process P4). More specifically, first, the differential signals Sig1 and Sig2 are output from the FPC 40 to the receiver 33a of the driver IC 33 through the pair of external connection wiring lines 35a and 35b. When the receiver 33a can receive the differential signals Sig1 and Sig2, it is not necessary to trim (for example, cut) the wiring pattern 86. In this case, the wiring pattern 86 is used as the terminating resistor 51 (see FIG. 6B).

On the other hand, when the receiver 33a cannot receive the differential signals Sig1 and Sig2 due to a small resistance value of the wiring pattern 86 and thus the resistance value of the wiring pattern 86 needs to increase, at least one of the first portion 21d (the first resistor 21d), the second portion 21e (the second resistor 21e), the third portion 21f (the third resistor 21f), the fourth portion 21g (the fourth resistor 21g), the fifth portion 21h (the fifth resistor 21h), and the sixth portion 21i (the sixth resistor 21i) is trimmed (cut or removed) using a laser or an etching technique, which makes it possible to easily manufacture a high-accuracy terminating resistor 51 capable of solving the problems of the related art.

As shown in FIGS. 6A and 6B, in the terminating resistor 51 manufacture in this way, the seventh resistor 20c (having the resistance value R2) is electrically connected in series to at least one (having a resistance value R2x) of the first resistor 21d, the second resistor 21e, the third resistor 21f, the fourth resistor 21g, the fifth resistor 21h, and the sixth resistor 21i.

In this way, it is possible to reliably output the differential signals Sig1 and Sig2 from the FPC 40 to the receiver 33a through the pair of external connection wiring lines 35a and 35b.

Next, components, such as a retardation plate 11 and a backlight 15, are mounted (process P5). Then, the element substrate according to another structure of the first embodiment is manufactured. In addition, this method can be used to manufacture element substrates according to the above-described embodiments other than the element substrate according to another structure of the first embodiment, which is not shown.

Figure 4:
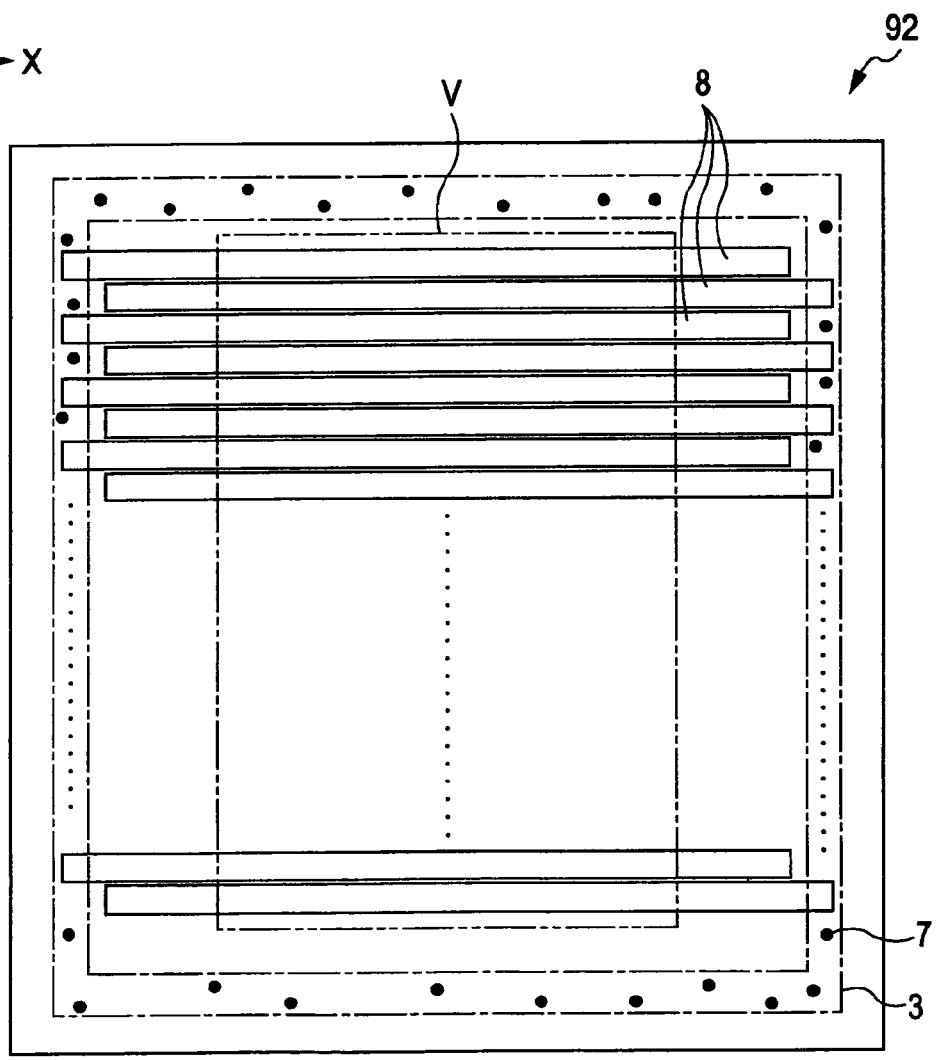
FIG. 4 is a plan view illustrating the structure of a color filter substrate according to the first embodiment of the invention.

Next, referring to FIG. 13 again, the color filter substrate 92 shown in FIGS. 2 and 4 is manufactured by a well-known method (step S2). Then, the element substrate and the color filter substrate 92 are bonded to each other with the sealing member 3 interposed therebetween, and liquid crystal is injected to the inside of the sealing member 3, thereby manufacturing the liquid crystal display device 100 according to the first to third embodiment of the invention.

According to the method of manufacturing the liquid crystal display device 100, the terminating resistor 51 is formed of the same material as that used for the pair of external connection wiring lines 35a and 35b in the same process as that in which the external connection wiring lines 35a and 35b are formed. Therefore, an independent process of manufacturing the terminating resistor 51 is not needed, which makes it possible to reduce the number of processes. However, when it is required to perform trimming to manufacture the high-accuracy terminating resistor 51, it goes without saying that the number of processes will increase by a number corresponding to the trimming process.

Electronic Apparatus

Next, examples of electronic apparatuses using the liquid crystal display device 100 according to the first to third embodiments of the invention a display device will be described below.

Figure 17:
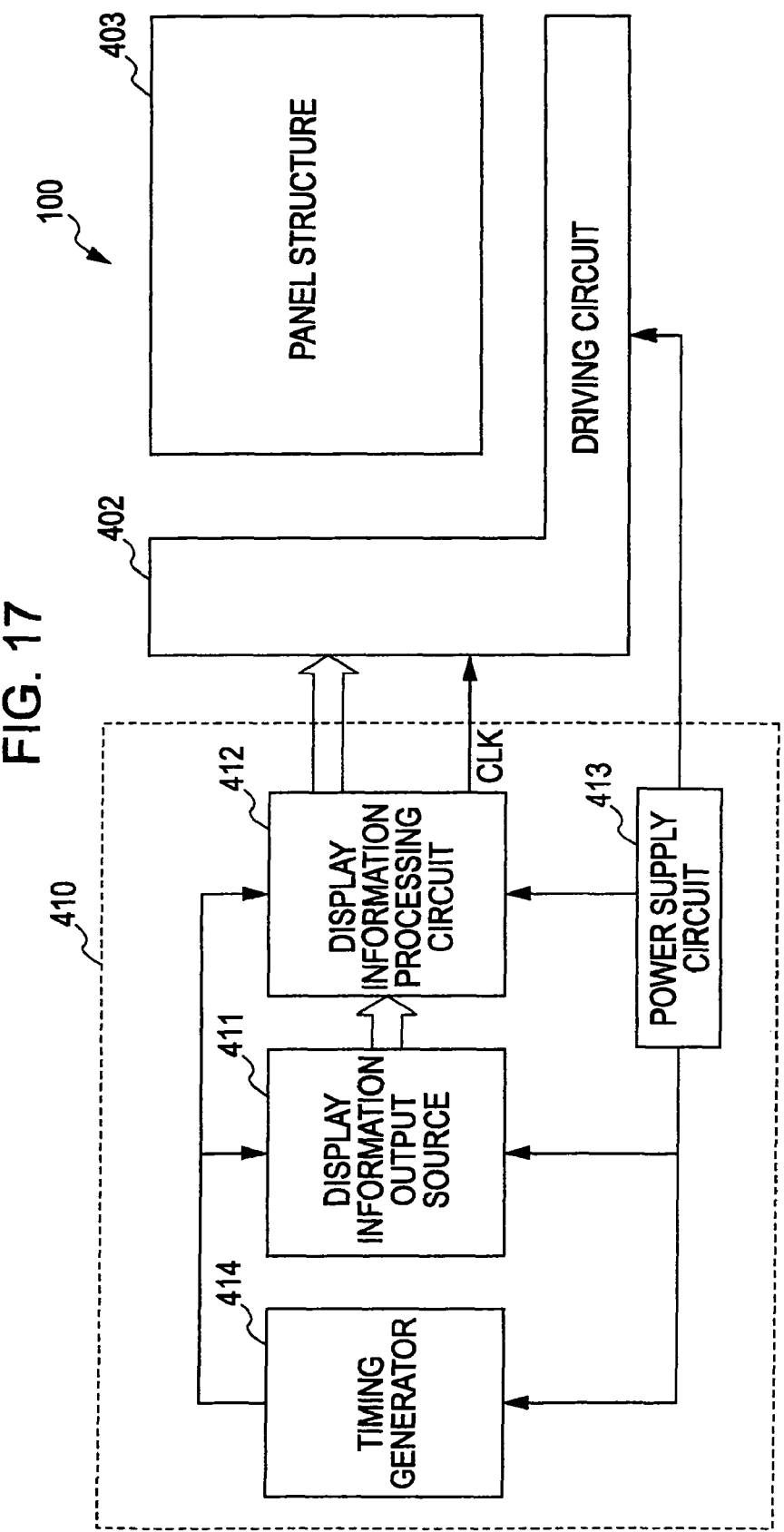
FIG. 17 is a circuit block diagram illustrating an example of an electronic apparatus to which the liquid crystal display device according to the embodiments of the invention is applied.

FIG. 17 is a block diagram illustrating the overall structure of this embodiment. An electronic apparatus show in FIG. 17 includes the liquid crystal display device 100 and a control unit 410 for controlling the liquid crystal display device 100. In FIG. 17, the liquid crystal display device 100 is conceptually divided into a liquid crystal panel structure 403 and a driving circuit 402 composed of, for example, a semiconductor IC. The control unit 410 includes a display information output source 411, a display information processing circuit 412, a power supply circuit 413, and a timing generating circuit 414.

The display information output source 411 includes, for example, a memory, such as a ROM (read only memory) or a RAM (random access memory), a storage unit, such as a magnetic recording disk or an optical recording disk, and a tuning circuit that tunes and outputs a digital image signal. The display information output source 411 supplies display information in a predetermined format of image signals to the display information processing circuit 412 on the basis of various clock signals generated by the timing generator 414.

The display information processing circuit 412 includes various well-known circuits, such as a serial-to-parallel conversion circuit, an amplification/inversion circuit, a rotation circuit, a gamma compensation circuit, and a clamp circuit. The display information processing circuit 412 processes the input display information and supplies the image information to the driving circuit 402 together with a clock signal CLK. The driving circuit 402 includes a scanning line driving circuit, a data line driving circuit, and a test circuit. The power supply circuit 413 supplies a predetermined voltage to the above-mentioned components.

Next, examples of electronic apparatuses to which the liquid crystal display device 100 according to the first to third embodiments of the invention can be applied will be described with reference to FIGS. 18A and 18B.

First, an example in which the liquid crystal display device 100 according to the first to third embodiments of the invention is applied to a display unit of a portable personal computer (a so-called notebook computer) will be described. FIG. 18A is a schematic perspective view showing the configuration of the personal computer. As shown in FIG. 18A, a personal computer 710 includes a main body 712 provided with a keyboard 711 and a display unit 713 using the liquid crystal display device according to the invention as a display panel.

Subsequently, an example in which the liquid crystal display device 100 according to the first to third embodiments of the invention is applied to a display unit of a cellular phone will be described. FIG. 18B is a perspective view showing the configuration of the cellular phone. As shown in FIG. 18B, a cellular phone 720 includes a plurality of operating buttons 721, an earpiece 722, a mouthpiece 723, and a display unit 724 using the liquid crystal display device according to the first to third embodiments of the invention.

Figure 18A:
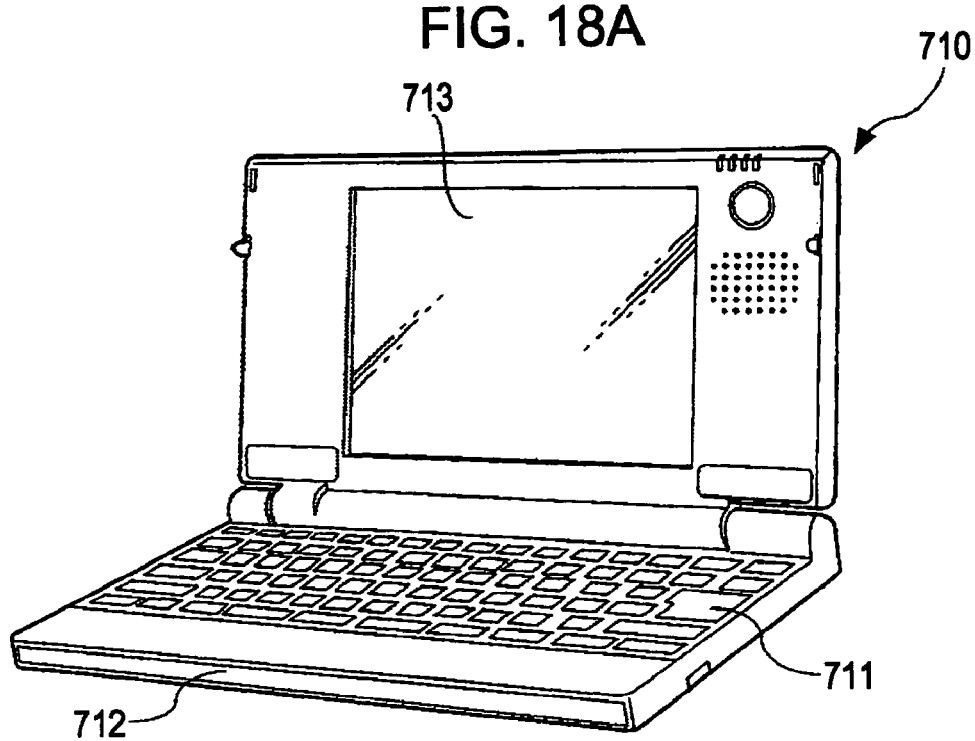
FIGS. 18A and 18B are examples of the electronic apparatus to which the liquid crystal display device according to the embodiments of the invention is applied.
Figure 18B:
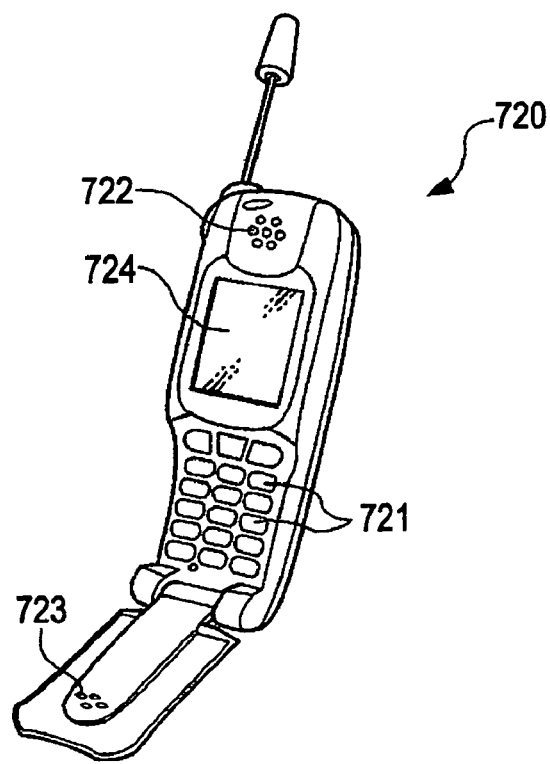

In addition to the personal computer shown in FIG. 18A and the cellular phone shown in FIG. 18B, the liquid crystal display device 100 according to the first to third embodiments of the invention can be applied to various electronic apparatuses, such as a liquid crystal television, a view finder type or monitor-direct-view type videotape recorder, a car navigation apparatus, a pager, an electronic organizer, an electronic calculator, a word processor, a workstation, a television phone, a POS terminal, and a digital still camera.

This application claims the benefit of Japanese Patent Application No. 2005-156677, filed May 30, 2005 and Japanese Patent Application No. 2005-281392, filed Sep. 28, 2005. The entire disclosure of the prior applications is hereby incorporated by reference herein in its entirety.

What is claimed is:

1. An electro-optical device comprising:
   a substrate;
   a signal generator external to the substrate for generating a pair of differential signals;
   at least a pair of wiring lines formed on the substrate, the pair of wiring lines including a first wiring line and a second wiring line extending parallel to each other on the substrate in a first extending direction;

an IC mounted on the substrate and electrically connected to the pair of wiring lines, the first wiring line being connected to the signal generator and being configured to transmit a first differential signal of the pair of differential signals to the IC, and the second wiring line being connected to the signal generator and being configured to transmit a second differential signal of the pair of differential signals to the IC, the second differential signal being the inverse of the first differential signal; and a resistor connected between of the first and second wiring lines, wherein the resistor includes:

a first wiring path connected to both the first and second wiring lines and extending from the first wiring line to the second wiring line in a second extending direction, substantially perpendicular to the first extending direction, a second wiring path that has U-shape and connected on a first side of the first wiring path, with respect to the second extending direction, so that an open side of the U-shape is entirely closed by the first wiring path, and a third wiring path that has U-shape and connected on a second side of the first wiring path, opposed to the first side of the first wiring path, with respect to the second extending direction, so that an open side of the U-shape is entirely closed by the first wiring path.

2. The electro-optical device according to claim 1, wherein the first, second and third wiring paths are configured to be cut to provide a single continuous signal path without any redundant signal paths.

3. The electro-optical device according to claim 1, wherein the resistor is a terminating resistor for removing a distortion in signals transmitted to the IC through the pair of wiring lines.

4. The electro-optical device according to claim 1, wherein the resistor is provided in the vicinity of the IC.

5. The electro-optical device according to claim 1, wherein, when the IC is mounted on the substrate with an anisotropic conductive film interposed therebetween, the resistor is provided so as not to contact the anisotropic conductive film protruding from the periphery of the IC to the outside.

6. The electro-optical device according to claim 1, wherein the pair of wiring lines are integrally formed with the resistor, and a layer forming the resistor extends from one of the pair of wiring lines.

7. The electro-optical device according to claim 1, wherein one end of each of the pair of wiring lines is connected to the IC, and the other ends of the pair of wiring lines are connected to a flexible printed substrate that includes the signal generator.

8. The electro-optical device according to claim 1, wherein the pair of wiring lines each have a laminated structure of the first conductive layer and the second conductive layer.

9. The electro-optical device according to claim 8, wherein the first conductive layer is formed of at least an elemental metal or a metal compound, and the second conductive layer is formed of a metal oxide.

10. The electro-optical device according to claim 9, wherein the elemental metal is Al or Cr, the metal compound is AlMo, and the metal oxide is ITO (indium tin oxide) or IZO (indium zinc oxide).

11. The electro-optical device according to claim 1, wherein differential signals are input to the pair of wiring lines according to a differential transmission scheme.

12. An electronic apparatus comprising as a display unit the electro-optical device according to claim 1.

* * * * *